US008072878B2

(12) United States Patent
Sakauchi et al.

(10) Patent No.: US 8,072,878 B2
(45) Date of Patent: Dec. 6, 2011

(54) PACKET RING NETWORK SYSTEM, PACKET TRANSFER SYSTEM, REDUNDANCY NODE, AND PACKET TRANSFER PROGRAM

(75) Inventors: Masahiro Sakauchi, Tokyo (JP); Daisaku Ogasahara, Tokyo (JP)

(73) Assignee: NEC Corporation, Tokyo (JP)

( * ) Notice: Subject to any disclaimer, the term of this patent is extended or adjusted under 35 U.S.C. 154(b) by 172 days.

(21) Appl. No.: 12/087,546

(22) PCT Filed: Jan. 5, 2007

(86) PCT No.: PCT/JP2007/050030
§ 371 (c)(1),
(2), (4) Date: Jul. 9, 2008

(87) PCT Pub. No.: WO2007/080831
PCT Pub. Date: Jul. 19, 2007

(65) Prior Publication Data
US 2009/0034412 A1 Feb. 5, 2009

(30) Foreign Application Priority Data
Jan. 11, 2006  (JP) ................................ 2006-003815

(51) Int. Cl.
*G01R 31/08* (2006.01)
*H04J 1/16* (2006.01)
*H04L 12/28* (2006.01)
*G06F 11/00* (2006.01)
(52) U.S. Cl. ........................................ 370/223; 370/254
(58) Field of Classification Search .................. 370/223, 370/254
See application file for complete search history.

(56) References Cited

U.S. PATENT DOCUMENTS 7,602,706 B1 * 10/2009 Gardo et al. ................... 370/219
(Continued)

FOREIGN PATENT DOCUMENTS

JP           62-150952           7/1987
(Continued)

OTHER PUBLICATIONS

"IEEE Standards 802. 17, Part 17: Resilient packet ring (RPR) access method & physical layer specifications", "5. Architecture Overview", "6.6.1 MAC Control sublayer", 9. Frame formats, IEEE (Institute of Electrical and Electronics Engineers, Inc), 2004, p. 27-54, p. 68-69, p. 221-223.

*Primary Examiner* — Ricky Ngo
*Assistant Examiner* — Paul Masur
(74) *Attorney, Agent, or Firm* — McGinn IP Law Group, PLLC

(57) ABSTRACT

In a ring network to which a plurality of nodes are connected, even though a failure occurs in a link between a node and a client apparatus (a user terminal) or a node itself, communication between the node and the client apparatus can be achieved. Nodes (105*a*) and (105*b*) are provided, so that, even though a failure occurs at either one of the nodes in the link between the node and the client apparatus (102), communication can be done between the other node and the client apparatus (102) through the link. When the node (105*a*) has a failure, the node (105*b*) succeeds in operation of the node (105*a*) while the node (105*a*) holds a state of the node (105*a*) to avoid a steering operation or a lap protection operation, a packet disappearance in the packet ring caused by the operation, influence of traffics a packet route change, etc., consumption of CPU and memory resources, and a ring transfer band reduction.

21 Claims, 17 Drawing Sheets

U.S. PATENT DOCUMENTS

| | | | |
|---|---|---|---|
| 2006/0092856 A1* | 5/2006 | Mitsumori | 370/254 |
| 2006/0120279 A1* | 6/2006 | Mitsumori | 370/218 |

FOREIGN PATENT DOCUMENTS

| | | |
|---|---|---|
| JP | 4-100446 | 4/1992 |
| JP | 2001-285323 | 10/2001 |
| JP | 2003-348038 | 12/2003 |
| JP | 2004-242194 | 8/2004 |
| JP | 2005-27368 | 1/2005 |
| JP | 2005-33243 | 2/2005 |
| JP | 2005-130049 | 5/2005 |

* cited by examiner

PACKET RING NETWORK SYSTEM, PACKET TRANSFER SYSTEM, REDUNDANCY NODE, AND PACKET TRANSFER PROGRAM

TECHNICAL FIELD

The present invention relates to a packet ring network system, a packet transfer method, a redundancy node, and a packet transfer program, and more particularly to a redundant packet ring network system, a packet transfer method, a redundancy node, and a packet transfer program.

BACKGROUND ART

Packet ring networks include an RPR (Resilient Packet Ring) standardized according to IEEE 802.17. The RPR is an MAC layer protocol for providing access to ring-like transmission mediums, and is capable of realizing quick failure recovery for devices in the category of carriers, effective network band utilization, and shortest route transfer.

FIG. 1 is a diagram illustrative of an RPR network configuration. As shown in FIG. 1, an RPR network includes a packet ring having two ringlets 151, 152 for transferring packets in mutually opposite directions. The packet ring interconnects a plurality of nodes in a ring fashion.

In the example shown in FIG. 1, four nodes 153a, 153b, 153c, 153d are connected to the packet ring. Each of the nodes on the packet ring is assigned an RPR MAC address. When the network is established, the nodes exchange control packets, and each of the nodes collects information about the number of hops and acquires topological information of the network.

A user terminal may be connected to each of the nodes on the packet ring. In the example shown in FIG. 1, user terminal 154a is connected to node 153a and user terminal 154b is connected to node 153b.

An RPR data packet standardized according to IEEE 802.17 will be described below.

FIG. 2 is a diagram illustrative of an RPR format. When a user terminal sends a packet to a node, it sends user data packet 211. User data packet 211 includes MAC address (MAC DA) 212 of a user terminal as the destination of the user data packet, MAC address (MAC SA) 213 of the user terminal as the source of the user data packet, transmission data 214, and FCS (Frame Check Sequence) 215.

When the node receives the user data packet from the user terminal, the node encapsulates the user data packet to generate RPR data packet 221, which is sent and received between the nodes. RPR data packet 221 includes encapsulated user data packet 211 that is stored as data 226.

RPR data packet 221 includes MAC address (RPR MAC SA) 225 of a destination node, MAC address (RPR MAC DA) 224 of the source node, Base Control field 223, TTL (Time To Live) field 222, and FCS 227.

Base Control field 223 includes information for specifying a ringlet to be used for transfer and identification information for identifying the type of a packet such as a control packet or the like. Details of the RPR data packet format are described in Non-patent Document 1.

The operation of each node on the packet ring to send, receive, and transfer an RPR data packet will be described below.

First, the operation with respect to a unicast data packet will be described below. Each node receives an RPR data packet transferred on the packet ring. If the RPR MAC DA of the RPR data packet is the same as the RPR MAC address of its own, each node deletes the RPR data packet from the packet ring.

If the RPR MAC DA of the received RPR data packet is different from the RPR MAC address of its own, each node decrements the TTL value (the value set in TTL field 222), and sends the RPR data packet again to the same ringlet as the ringlet from which the RPR data packet has been received. If the source node receives a unicast data packet sent thereby, the source node deletes the unicast data packet from the packet ring. When the TTL value becomes nil, each node deletes the RPR data packet from the packet ring.

The operation with respect to a broadcast data packet will be described below. After decrementing the TTL value of a received broadcast data packet, each node transfers the broadcast data packet to a next node. If the source node which has sent the broadcast data packet receives the broadcast data packet sent thereby, the source node deletes the broadcast data packet from the packet ring. When the TTL value becomes nil, each node deletes the RPR packet from the packet ring.

An RPR control packet (hereinafter referred to as "control packet") standardized according to IEEE 802.17 will be described below.

In order to make all nodes belonging to an RPR network able to perform autonomous functions including a topology discovery function, a protection function, and OAM (Operation, Administration, and Maintenance) function, each RPR node sends and receives a control packet via a data path.

FIG. 3 is a diagram illustrative of a configurational example of a conventional node in a packet ring network. In the example shown in FIG. 3, ringlet-0 data path 10 and ringlet-1 data path 20 send a generated control packet to respective ringlets, and receive control packets from the ringlets. The control packets are individually defined with respect to the above functions according to IEEE 802.17. Packets are transferred in ringlet-0 data path 10 and ringlet-1 data path 20 in the same manner as the RPR data packet is transferred as described above.

The operation of the RPR network shown in FIG. 1 for user terminal 154a connected to node 153a to send data to user terminal 154b connected to node 153b will be described below.

Each node learns MAC SA 213 (see FIG. 2) of the source user terminal, which is encapsulated in the received RPR data packet, and source RPR MAC SA 225 (see FIG. 2) in association each other, and holds a database of RPR MAC addresses accessible using the MAC addresses of the user terminals as a retrieval key. The database of RPR MAC addresses accessible using the MAC addresses of the user terminals as a retrieval key will be referred to as FDB (Filtering DataBase).

When user terminal 154a sends data (user data packet) to the packet ring, node 153a receives the user data packet. Using MAC DA 212 (see FIG. 2) of the received user data packet as a retrieval key, node 153 searches the FDB, and uses the result as RPR MAC DA 224 (the MAC address of the destination node, see FIG. 2).

Node 153a uses its own MAC address as RPR MAC SA 225 (the MAC address of the source node, see FIG. 2). Node 153a encapsulates the user data packet received from user terminal 154a. Furthermore, node 153a searches a topology database, selects a ringlet for providing the shortest route from the source node to the destination node, sets a TTL value, and sends an RPR data packet to the packet ring.

If the association of the MAC address of the user terminal as the destination and the RPR MAC address corresponding to the MAC address has not been learned as a result of the searching of the FDB, then node 153*a* performs flooding. The RPR MAC DA of the RPR data packet sent by the flooding is set to a broadcast address, so that the RPR data packet is received by all the nodes on the packet ring.

As a result of the flooding, the user data packet sent by user terminal 154*a* is received by destination user terminal 154*b*. Normally, user terminal 154*b* replies to user terminal 154*a* in a higher-level layer. At the time of replying, user terminal 154*b* serves as the source of the user data packet, and user terminal 154*a* as the destination. Node 153*b* serves as the source of the RPR packet.

When user terminal 154*b* replies, node 153*a* learns the association between the MAC address of user terminal 154*b* and the RPR MAC address of node 153*b*. Therefore, when user terminal 154*a* sends a user data packet again to user terminal 154*b*, node 153*a* searches for the RPR MAC address of node 153*b* using MAC DA 212 included in the user data packet as a key, and can perform a unicast transfer using the search result as RPR MACC 224.

Processes for flooding a broadcast packet to the packet ring include a process in which the source node sends the broadcast packet to an arbitrary one of the ringlets and a process in which the source node sends the broadcast packet to both ringlets and transfers the broadcast packet to a reaching point which has been established in advance on the packet ring for the prevention of a multiple transfer (bidirectional flooding).

The reaching point which has been established in advance on the packet ring for the prevention of a multiple transfer is referred to as a cleave point. According to the bidirectional flooding, depending on whether the number of nodes on the packet ring is an even number or an odd number, it is necessary to change the process of calculating the TTL value so that a packet will be transferred to all the nodes and will not arrive doubly at the nodes. The TTL value calculating process will not be described below as it has little bearing on the present invention.

A TP frame will be described below. The TP frame is a fixed-length frame and serves as a control frame for indicating information representative of the state of span protection and edge of a node and a sequence number to all the nodes other than its own node. The number of nodes making up the packet ring network is set in the TTL value, and the TP frame is broadcast to both ringlet-0 and ringlet-1. Each node collects the information of TP frames received from all the nodes other than itself, and constructs a topology database.

The protective operation of an RPR at the time of a link failure will be described below with reference to FIGS. 4A through 4C. FIGS. 4A through 4C are diagrams showing an example of a packet ring network in the event of a failure occurring in a link.

According to IEEE 802.17, a steering mode and a lap mode are defined for the protective operation at the time of a failure. The steering mode is defined as an essential function, and the lap mode as a selective function. The steering mode and the lap mode are referred to in Patent Document 1.

FIG. 4A is a diagram illustrative of an ordinary network operation. In FIG. 4A, a packet is transferred on ringlet 301 from node 303*a* to node 303*b*.

FIG. 4B is a diagram illustrative of a steering mode of operation. As shown in FIG. 4B, in the event of the occurrence of failure point 304, all the nodes on the packet ring obtain the positional information of failure point 304. Specifically, nodes 303*c*, 303*d* that are connected to the link containing failure point 304 indicate the positional information of failure point 304 to all the nodes. As a result, each node recognizes the position of failure point 304.

For sending a unicast packet, the source node selects a ringlet which does not include failure point 304 between itself and a destination node to which an RPR packet is to be sent, and sends the unicast packet.

For example, if node 303*a* is to send a unicast packet to node 303*b*, node 303*a* recognizes the position of failure point 304 and, based on the recognized position, changes the ringlet for sending the unicast packet from ringlet 301 to ringlet 302, and transfers the packet to node 303*b*. For sending a broadcast packet, node 303*a* selects both ringlets 301, 302 and sends the broadcast packet to ringlets 301, 302. As a result, the broadcast packet is sent to each node on the packet ring.

FIG. 4C is a diagram illustrative of a lap mode of operation. In the lap mode, the source node selects the same ringlet as with the normal operation and sends an RPR packet. For example, if node 303*a* is to send an RPR packet to node 303*b*, node 303*a* selects ringlet 301 as with the normal operation (see FIG. 4A) and sends an RPR packet.

Node 303*c* is connected to the link containing failure point 304 and has detected the failure. When node 303*c* receives the RPR packet, node 303*c* selects ringlet 302 which is different from the ringlet through which the packet has been sent, and transfers the RPR packet through ringlet 302.

Specifically, node 303*c* transfers the RPR packet to an area which is free of failure point 304. The packet is transferred through ringlet 302 to node 303*d* that is connected to the link containing failure point 304 and has detected the failure. Node 303*d* also selects the ringlet which is different from the ringlet through which the packet has been sent, and transfers the RPR packet through the ringlet. As a result, node 303*b* receives the RPR packet.

FIGS. 5A through 5C are diagrams showing an example of a packet ring network in the event of a failure occurring in a node. As shown in FIGS. 5A through 5C, the protective operation of the RPR in the event of a failure occurring in a node is the same as the operation in the event of a failure occurring in a link (see FIGS. 4A through 4C).

As described above, the protective operation of the RPR according to IEEE 802.17 makes it possible to realize quick failure recovery from a span failure and quick failure recovery of inter-node communications from a node failure except for a node that is suffering the node failure. However, it fails to define a redundant configuration for RPR nodes, and when a failure occurs on a node, the node loses its connectivity to a client apparatus to which the node has been connected, and is unable to communicate with the client apparatus.

There is no definition either about failure recovery from a link failure with respect to a link by which a client is connected to an RPR node. When such a link failure occurs, the node loses its connectivity to the client apparatus, and is unable to communicate with the client apparatus.

Furthermore, in either the steering protection mode or the lap protection mode, the ring transfer band is narrower than in the normal operation.

Generally, network devices in the category of carriers need to have a redundant configuration for each card or each device, and are required to recover quickly from a failure occurring in the card, the device, and their connection.

According to IEEE 802.17, it is assumed that the node shown in FIG. 3 is connected as a single node to a client apparatus. There is no definition about the connectivity between an RPR and a client apparatus in the event of a failure. If the node shown in FIG. 3 is installed as a hardware unit such as a single integrated circuit, card, or device, then in the event of a failure of the hardware unit or the connection to the hardware unit, a disturbance such as a packet transfer route change, a utilizable band reduction, or the like affects other packet ring nodes, and the connectivity of the node to its client apparatus is lost.

Patent Document 2, Patent Document 3, and Patent Document 4 disclose a node configuration including an active node which is operable in a normal state and a backup node which is not operable in the normal state. According to the node configuration, the active node switches to the backup node in the event of a failure of the active node.

Patent Document 1: JP-A No. 2004-242194 (paragraph 0004, paragraph 0012, FIG. 1)
Patent Document 2: JP-A No. 4-100446 (p. 4-5, FIG. 1)
Patent Document 3: JP-A No. 2005-130049 (p. 10-11, FIG. 1)
Patent Document 4: JP-A No. 2005-27368 (p. 6-8, FIG. 1)
Non-patent Document 1: "IEEE Standards 802. 17, Part 17: Resilient packet ring (RPR) access method & physical layer specifications", "5. Architecture Overview", "6.6.1 MAC Control sublayer", "9. Frame formats, IEEE (Institute of Electrical and Electronics Engineers, Inc), 2004, p. 27-54, p. 68-69, p. 221-223

DISCLOSURE OF THE INVENTION

Problems to be Solved by the Invention

As described above, with the ring network configuration shown in FIG. 1, when a failure occurs on the link between a node and a client apparatus (user terminal), it becomes impossible to communicate between the node and the client apparatus. However, even in the event of a failure of the link between a node and a client apparatus, it is preferable to recover from the failure without affecting the entire packet ring network.

It may be proposed to apply the technologies described in Patent Document 2, Patent Document 3, and Patent Document 4 to the RPR. Specifically, each node is constructed as a duplex system including an active node and a backup node, which are connected to the same client apparatus by individual links, respectively. However, such a system suffers the following problems:

The protective operation of an RPR includes a steering mode and a lap mode as described above. These protective operation modes are performed when a failure occurs on a link interconnecting nodes of the packet ring network or on a node of the packet ring network, and the failure affects the entire packet ring network.

In the steering mode, all the nodes of the packet ring network have to be instructed by a control packet to select a ringlet which is capable of sending an RPR packet to a destination without passing through the failure site. Each of the nodes consumes CPU and memory resources for updating topological information.

In the steering mode, furthermore, there are produced nodes that are limited to one ringlet capable of sending packets. As a result, the efficiency with which the packet ring utilizes the band is greatly reduced.

When the RPR operation changes to the lap mode, the packet ring suffers problems in that the ring band is reduced to one-half and packets of a strict packet arrival sequence mode (strict mode) existing in the packet ring are discarded.

In the steering mode and the lap mode, therefore, the communication quality is lowered due to a loss of packets and a disturbance such as a change in the flow rate of packets.

While a client and an active node are normally communicating with each other, the active node learns the MAC SA of a source user terminal and the RPR MAC SA of the source, which are encapsulated in a received RPR data packet, in association with each other, and stores them in an FDB.

At this time, if the backup node does not learn the same data, then when the link between the active node and the client apparatus suffers a failure and the active node switches to the backup node, it is difficult to quickly recover a stable packet traffic.

If the backup node does not learn the same data as the active node, then the backup node is unable to retrieve an RPR MAC DA, and has to broadcast an RPR packet in which a user data packet from the client terminal is encapsulated. Such broadcast transmission is carried out until the backup node sufficiently leans the association between the MAC address of the client apparatus and the RPR MAC address of the node.

However, the broadcast transmission increases the communications traffic, placing a burden on the ring capacity of the packet ring network. As a result, when the active node switches to the backup node, it is difficult to quickly recover a stable packet traffic.

In the normal operation, the client apparatus communicates with the active node, but not with the backup node. In the normal operation, therefore, the traffic processing capability of the backup node cannot be utilized, and hence the efficiency with which to utilize resources is poor.

It is an exemplary object of the present invention to provide a packet ring network system, a packet transfer method, a redundancy node, and a packet transfer program which allow a backup node to quickly recover a stable packet traffic in the event of a failure of an active node.

Means for Solving the Problems

According to the present invention, a packet ring network system including nodes for sending and receiving packets, which are connected respectively to two ringlets for transferring packets therethrough in mutually opposite directions, includes a redundancy node including two nodes having the same address, and a client apparatus connected to the two nodes included in the redundancy node, the redundancy node including packet distributing means for duplicating packets received from the ringlets and distributing the received packets and the duplicate packets to the nodes included in the redundancy node, failure detecting and indicating means for detecting the occurrence of a failure on each of the nodes included in the redundancy node and indicating the occurrence of the failure to each of the nodes, and output selecting means for, when a failure occurs on one of the nodes, selecting a packet output from the other node as a packet to be output from the redundancy node, and when in a normal state, selecting a packet output from one of the nodes as a packet to be output from the redundancy node, each of the nodes included in the redundancy node including client apparatus connecting means for connecting the redundancy node to the client apparatus by a link when in a normal state, and disconnecting the redundancy node from the client apparatus when a failure occurs.

Each of the nodes included in the redundancy node may include filtering means for permitting or inhibiting the transmission of packets received from the ringlets to the client apparatus depending on whether or not there is a failure on an active node as one of the nodes, and when in a normal state, the output selecting means may select packets output from the active node as packets to be sent from the redundancy node, and when a failure occurs on the active node, the output selecting means may select packets output from a backup node, as the other node, as packets to be sent from the redundancy node.

According to the present invention, a packet ring network system including nodes for sending and receiving packets, which are connected respectively to two ringlets for transferring packets therethrough in mutually opposite directions, includes a redundancy node including two nodes having the same address, and a client apparatus connected to the two nodes included in the redundancy node, wherein one of the nodes included in the redundancy node sends packets to one of the ringlets as being output from the redundancy node, and the other node included in the redundancy node sends packets to the other ringlet as being output from the redundancy node, the redundancy node including packet distributing means for duplicating packets received from the ringlets and distributing the received packets and the duplicate packets to the nodes included in the redundancy node, failure detecting and indicating means for detecting the occurrence of a failure on each of the nodes included in the redundancy node and indicating the occurrence of the failure to each of the nodes, and output selecting means for, when in a normal state, selecting packets output from one of the nodes as packets to be sent to one of the ringlets and selecting packets output from the other node as packets to be sent to the other ringlet, and when a failure occurs on one of the nodes included in the redundancy node, selecting packets output from the other node which is free of the failure as packets to be sent to the ringlet to which the node has sent packets, each of the nodes included in the redundancy node including filtering means for permitting the ringlet, which transmits packets, to transmit received packets to the client apparatus, and inhibiting the ringlet which does not transmit packets from transmitting received packets to the client apparatus, ringlet selecting means for selecting a ringlet for sending packets therethrough, multiplexing means for multiplexing packets to be transmitted to one of the ringlets, which is selected by the ringlet selecting means, and packets to be transmitted to the one of the ringlets, which is selected by the ringlet selecting means, disposed in the other node, output switching means for outputting packets to the multiplexing means of its own node if packets generated based on packets received from the client apparatus are packets selected to be output from its own node to the ringlets by the output selecting means, outputting packets to the multiplexing means of the other node if packets generated based on packets received from the client apparatus are packets selected to be output from the other node to the ringlet by the output selecting means, and outputting packets to the multiplexing means of its own node if a failure occurs on the other node, and client apparatus connecting means for connecting the redundancy node to the client apparatus through a link when in a normal state, and disconnecting the redundancy node from the client apparatus when a failure occurs.

When a failure occurs on one of links between the client apparatus and the two nodes included in the redundancy node, the client apparatus may send packets to the node connected thereto by the link which is free of the failure, and when a failure occurs on the link between the other node and the client apparatus, the filtering means may permit packets received from any one of the ringlets to be sent to the client apparatus.

According to the present invention, a packet ring network system including nodes for sending and receiving packets, which are connected respectively to two ringlets for transferring packets therethrough in mutually opposite directions, includes a redundancy node including two packet transfer units having the same address, for sending packets to the ringlets and receiving packets from the ringlets, and a plurality of packet processors for outputting packets received from a client apparatus to the packet transfer units and sending packets received from the ringlets by the packet transfer units to the client apparatus, wherein one of the packet transfer units sends packets to one of the ringlets and the other packet transfer unit sends packets to the other ringlet, and the client apparatus connected to the packet processors included in the redundancy node by a link, the redundancy node includes packet distributing means for duplicating packets received from the ringlets and distributing the received packets and the duplicate packets to the packet transfer units included in the redundancy node, failure detecting and indicating means for detecting the occurrence of a failure on each of the packet transfer units and the packet processors included in the redundancy node and indicating the occurrence of the failure to each of the packet transfer units and the packet processors, and output selecting means for, when in a normal state, selecting packets output from one of the packet transfer units as packets to be sent to one of the ringlets and selecting packets output from the other packet transfer unit as packets to be sent to the other ringlet, and when a failure occurs on one of the packet transfer units included in the redundancy node, selecting packets output from the other packet transfer unit which is free of the failure as packets to be sent to the ringlet to which the packet transfer unit has sent packets, each of the packet processors including transfer unit selecting means for, when a failure occurs on one of the packet transfer units, outputting packets received from the client apparatus to the other packet transfer unit, multiplexing means for multiplexing packets received from the two packet transfer units, filtering means for permitting or inhibiting the transmission of packets received from the ringlets to the client apparatus depending on whether there is a failure or not, and client apparatus connecting means for connecting the redundancy node to the client apparatus through the link when in a normal state and disconnecting the redundancy node from the client apparatus when a failure occurs.

The packet transfer units may duplicate packets to be output to the packet processors so as to be able to distribute the packets to all the packet processors included in the redundancy node, and distribute the duplicated packets to all the packet processors, and when in a normal state, only the filtering means included in one of the packet processors may permit packets received from one of the ringlets to be sent to the client apparatus, and only the filtering means included in another one of the packet processors may permit packets received from the other ringlet to be sent to the client apparatus, and when a failure occurs on the packet processor including the filtering means which permits the packets received from the one or other ringlet to be sent to the client apparatus, only the filtering means included in still another one of the packet processors may permit packets received from the one or other ringlet to be sent to the client apparatus.

According to the present invention, there is provided a packet transfer method of transferring packets in a packet ring network system including two ringlets for transferring packets therethrough in mutually opposite directions, nodes for sending and receiving packets, a redundancy node connected to the ringlets and including two nodes having the same address, and a client apparatus connected to the nodes included in the redundancy node, wherein the redundancy node duplicates packets received from the ringlets and distributes the received packets and the duplicate packets to the nodes included in the redundancy node, when in a normal state, selects packets output from one of the nodes as packets to be output from the redundancy node, when in a normal state, connects the redundancy node to the client apparatus through a link, when an occurrence of a failure on each of the nodes included in the redundancy node is detected, indicates the occurrence of the failure to each of the nodes, when a failure occurs on one of the nodes, selects packets output from the other nodes as packets to be sent from the redundancy node, and when a failure occurs, disconnects the redundancy node from the client apparatus.

Each of the nodes included in the redundancy node may permit or inhibit the transmission of packets received from the ringlets to the client apparatus depending on whether or not there is a failure on an active node as one of the nodes, and when in a normal state, each of the nodes may select packets output from the active node as packets to be sent from the redundancy node, and when a failure occurs on the active node, each of the nodes selects packets output from a backup node, as the other node, as packets to be sent from the redundancy node.

According to the present invention, there is provided a packet transfer method of transferring packets in a packet ring network system including two ringlets for transferring packets therethrough in mutually opposite directions, nodes for sending and receiving packets, and a redundancy node connected to the ringlets and including two nodes having the same address, and a client apparatus connected to the nodes included in the redundancy node, wherein one of the nodes included in the redundancy node sends packets to one of the ringlets as being output from the redundancy node, the other node included in the redundancy node sends packets to the other ringlet as being output from the redundancy node, the redundancy node duplicates packets received from the ringlets and distributes the received packets and the duplicate packets to the nodes included in the redundancy node, when in a normal state, selects packets output from one of the nodes as packets to be sent to one of the ringlets and selects packets output from the other node as packets to be sent to the other ringlet, detects an occurrence of a failure on each of the nodes included in the redundancy node, and indicates the occurrence of the failure to each of the nodes, and when a failure occurs on one of the nodes included in the redundancy node, selects packets output from the other node which is free of the failure as packets to be sent to the ringlet to which the node has sent packets, and each of the nodes included in the redundancy node multiplexes packets to be transmitted to one of the ringlets which is selected as a ringlet for transmitting packets therethrough and packets to be transmitted to the one of the ringlets which is selected by the other node, permits the ringlet which transmits packets to transmit received packets to the client apparatus, and inhibits the ringlet which does not transmit packets from transmitting received packets to the client apparatus, connects the redundancy node to the client apparatus through a link when in a normal state, and disconnects the redundancy node from the client apparatus when a failure occurs, multiplexes packets on its own node if packets generated based on packets received from the client apparatus are packets selected to be output from its own node to the ringlets, and multiplexes packets on the other node if packets generated based on packets received from the client apparatus are packets selected to be output from the other node to the ringlet, and multiplexes packets on its own node if a failure occurs on the other node.

When a failure occurs on one of links between the client apparatus and the two nodes included in the redundancy node, the client apparatus may send packets to the node connected thereto by the link which is free of the failure, and when a failure occurs on the link between the other node and the client apparatus, each of the nodes may permit packets received from any one of the ringlets to be sent to the client apparatus.

According to the present invention, there is provided a packet transfer method of transferring packets in a packet ring network system including two ringlets for transferring packets therethrough in mutually opposite directions, a redundancy node including two packet transfer units having the same address, for sending packets to the ringlets and receiving packets from the ringlets, and a plurality of packet processors for sending packets to and receiving packets from a client apparatus, and the client apparatus connected to the packet processors included in the redundancy node by a link, wherein one of the packet transfer units sends packets to one of the ringlets, and the other packet transfer unit sends packets to the other ringlets, the redundancy node duplicates packets received from the ringlets and distributes the received packets and the duplicate packets to the packet transfer units included in the redundancy node, when in a normal state, selects packets output from one of the packet transfer units as packets to be sent to one of the ringlets and selects packets output from the other packet transfer unit as packets to be sent to the other ringlet, detects an occurrence of a failure on each of the packet transfer units and the packet processors included in the redundancy node, and indicates the occurrence of the failure to each of the packet transfer units and the packet processors, when a failure occurs on either one of the packet transfer units included in the redundancy node, selects packets output from the other packet transfer unit which is free of the failure as packets to be sent to the ringlet to which the packet transfer unit has sent packets, each of the packet processors connects the redundancy node to the client apparatus through the link when in a normal state, multiplexes packets received from the two packet transfer units, outputs packets received from the client apparatus to the packet transfer units, and sends packets received from the ringlets by the packet transfer units to the client apparatus, permits or inhibits a transmission of packets received from the ringlets to the client apparatus depending on whether there is a failure or not, disconnects the redundancy node from the client apparatus when a failure occurs, and when a failure occurs on one of the packet transfer units, output packets received from the client apparatus to the other packet transfer unit, and the client apparatus sends and receives packets to and from the packet processor depending on the ringlet through which packets are sent and received.

The packet transfer units may duplicate packets to be output to the packet processors so as to be able to distribute the packets to all the packet processors included in the redundancy node, and distribute the duplicated packets to all the packet processors, and when in a normal state, only one of the packet processors may permit packets received from one of the ringlets to be sent to the client apparatus, and only another one of the packet processors may permit packets received from the other ringlet to be sent to the client apparatus, and when a failure occurs on the packet processor which permits the packets received from the one or other ringlet to be sent to the client apparatus, only still another one of the packet processors may permit packets received from the one or other ringlet to be sent to the client apparatus.

According to the present invention, there is provided a redundancy node connected to two ringlets for transferring packets therethrough in mutually opposite directions and a client apparatus for sending and receiving packets, the redundancy node including two nodes having the same address for sending and receiving packets, wherein the redundancy node includes packet distributing means for duplicating packets received from the ringlets and distributing the received packets and the duplicate packets to the nodes included in the redundancy node, failure detecting and indicating means for detecting an occurrence of a failure on each of the nodes included in the redundancy node and indicating the occurrence of the failure to each of the nodes, and output selecting means for, when a failure occurs on one of the nodes, selecting a packet output from the other node as a packet to be sent from the redundancy node, and when in a normal state, selecting a packet output from one of the nodes as a packet to be sent from the redundancy node, each of the nodes included in the redundancy node including client apparatus connecting means for connecting the redundancy node to the client apparatus when in a normal state, and disconnecting the redundancy node from the client apparatus when a failure occurs.

Each of the nodes included in the redundancy node may include filtering means for permitting or inhibiting the transmission of packets received from the ringlets to the client apparatus depending on whether there is a failure on an active node as one of the nodes or not, and when in a normal state, the output selecting means may select packets output from the active node as packets to be sent from the redundancy node, and when a failure occurs on the active node, the output selecting means may select packets output from a backup node as the other node as packets to be sent from the redundancy node.

According to the present invention, there is provided a redundancy node connected to two ringlets for transferring packets therethrough in mutually opposite directions and a client apparatus for sending and receiving packets, the redundancy node including two nodes having the same address for sending and receiving packets, wherein one of the nodes included in the redundancy node sends packets to one of the ringlets as being output from the redundancy node, and the other node included in the redundancy node sends packets to the other ringlet as being output from the redundancy node, the redundancy node including packet distributing means for duplicating packets received from the ringlets and distributing the received packets and the duplicate packets to the nodes included in the redundancy node, failure detecting and indicating means for detecting an occurrence of a failure on each of the nodes included in the redundancy node and indicating the occurrence of the failure to each of the nodes, and output selecting means for, when in a normal state, selecting packets output from one of the nodes as packets to be sent to one of the ringlets and selecting packets output from the other node as packets to be sent to the other ringlet, and when a failure occurs on one of the nodes included in the redundancy node, selecting packets output from the other node which is free of the failure as packets to be sent to the ringlet to which the node has sent packets, each of the nodes included in the redundancy node including filtering means for permitting the ringlet which transmits packets to transmit received packets to the client apparatus, and inhibiting the ringlet which does not transmit packets from transmitting received packets to the client apparatus, ringlet selecting means for selecting a ringlet for sending packets therethrough, multiplexing means for multiplexing packets to be transmitted to one of the ringlets which is selected by the ringlet selecting means and packets to be transmitted to the one of the ringlets which is selected by the ringlet selecting means disposed in the other node, output switching means for outputting packets to the multiplexing means of its own node if packets generated based on packets received from the client apparatus are packets selected to be output from its own node to the ringlets by the output selecting means, outputting packets to the multiplexing means of the other node if packets generated based on packets received from the client apparatus are packets selected to be output from the other node to the ringlet by the output selecting means, and outputting packets to the multiplexing means of its own node if a failure occurs on the other node, and client apparatus connecting means for connecting the redundancy node to the client apparatus through a link when in a normal state, and disconnecting the redundancy node from the client apparatus when a failure occurs.

When a failure occurs on the link between the other node and the client apparatus, the filtering means may permit packets received from any one of the ringlets to be sent to the client apparatus.

According to the present invention, there is provided a redundancy node connected to two ringlets for transferring packets therethrough in mutually opposite directions and a client apparatus for sending and receiving packets, for sending and receiving packets to and from nodes connected to the ringlets and the client apparatus, including two packet transfer units having the same address, for sending packets to the ringlets and receiving packets from the ringlets, a plurality of packet processors for outputting packets received from a client apparatus to the packet transfer units and sending packets received from the ringlets by the packet transfer units to the client apparatus, packet distributing means for duplicating packets received from the ringlets and distributing the received packets and the duplicate packets to the packet transfer units included in the redundancy node, failure detecting and indicating means for detecting the occurrence of a failure on each of the packet transfer units and the packet processors included in the redundancy node and indicating the occurrence of the failure to each of the packet transfer units and the packet processors, and output selecting means for, when in a normal state, selecting packets output from one of the packet transfer units as packets to be sent to one of the ringlets and selecting packets output from the other packet transfer unit as packets to be sent to the other ringlet, and when a failure occurs on one of the packet transfer units included in the redundancy node, selecting packets output from the other packet transfer unit which is free of the failure as packets to be sent to the ringlet to which the packet transfer unit has sent packets, each of the packet processors including multiplexing means for multiplexing packets received from the two packet transfer units, transfer unit selecting means for, when a failure occurs on one of the packet transfer units, outputting packets received from the client apparatus to the other packet transfer unit, filtering means for permitting or inhibiting a transmission of packets received from the ringlets to the client apparatus depending on whether there is a failure or not, and client apparatus connecting means for connecting the redundancy node to the client apparatus through the link when in a normal state and disconnecting the redundancy node from the client apparatus when a failure occurs, wherein one of the packet transfer units sends packets to one of the ringlets, and the other packet transfer unit sends packets to the other ringlet.

The packet transfer units may duplicate packets to be output to the packet processors so as to be able to distribute the packets to all the packet processors included in the redundancy node, and distribute the duplicated packets to all the packet processors, and when in a normal state, only the filtering means included in one of the packet processors may permit packets received from one of the ringlets to be sent to the client apparatus, and only the filtering means included in another one of the packet processors may permit packets received from the other ringlet to be sent to the client apparatus, and when a failure occurs on the packet processor including the filtering means which permits the packets received from the one or other ringlet to be sent to the client apparatus, only the filtering means included in still another one of the packet processors may permit packets received from the one or other ringlet to be sent to the client apparatus.

According to the present invention, there is provided a packet transfer program incorporated in a redundancy node connected to two ringlets for transferring packets therethrough in mutually opposite directions and a client apparatus for sending and receiving packets, the redundancy node including two nodes having the same address for sending and receiving packets, wherein the packet transfer program enables a computer to carry out a packet distributing process for duplicating packets received from the ringlets and distributing the received packets and the duplicate packets to the nodes included in the redundancy node, a failure detecting and indicating process for detecting the occurrence of a failure on each of the nodes included in the redundancy node and indicating the occurrence of the failure to each of the nodes, an output selecting process for, when a failure occurs on one of the nodes, selecting a packet output from the other node as a packet to be output from the redundancy node, and when in a normal state, selecting a packet output from one of the nodes as a packet to be output from the redundancy node, and a client apparatus connecting process for connecting the redundancy node to the client apparatus when in a normal state, and disconnecting the redundancy node from the client apparatus when a failure occurs.

According to the present invention, there is provided a packet transfer program incorporated in a redundancy node connected to two ringlets for transferring packets therethrough in mutually opposite directions and a client apparatus for sending and receiving packets, the redundancy node including two nodes having the same address for sending and receiving packets, wherein the packet transfer program enables a computer to carry out a packet distributing process for duplicating packets received from the ringlets and distributing the received packets and the duplicate packets to the nodes included in the redundancy node, a failure detecting and indicating process for detecting an occurrence of a failure on each of the nodes included in the redundancy node and indicating the occurrence of the failure to each of the nodes, an output selecting process for, when in a normal state, selecting packets output from one of the nodes as packets to be sent to one of the ringlets and selecting packets output from the other node as packets to be sent to the other ringlet, and when a failure occurs on one of the nodes included in the redundancy node, selecting packets output from the other node which is free of the failure as packets to be sent to the ringlet to which the node has sent packets, a filtering process for permitting the ringlet, which transmits packets, to transmit received packets to the client apparatus, and inhibiting the ringlet which does not transmit packets from transmitting received packets to the client apparatus, a multiplexing process for multiplexing packets to be transmitted to one of the ringlets which is selected as a ringlet for transmitting packets therethrough and packets to be transmitted to the one of the ringlets which is selected as a ringlet for transmitting packets therethrough by the other node, an output switching process for multiplexing packets on its own node if packets generated based on packets received from the client apparatus are packets selected to be output from its own node to the ringlets in the output selecting process, multiplexing packets on the other node if packets generated based on packets received from the client apparatus are packets selected to be output from the other node to the ringlet in the output selecting process, and multiplexing packets on its own node if a failure occurs on the other node, and a client apparatus connecting process for connecting the redundancy node to the client apparatus through a link when in a normal state, and disconnecting the redundancy node from the client apparatus when a failure occurs.

According to the present invention, there is provided a packet transfer program incorporated in a redundancy node in a packet ring network including two ringlets for transferring packets therethrough in mutually opposite directions, a redundancy node including two packet transfer units having the same address, for sending packets to the ringlets and receiving packets from the ringlets, and a plurality of packet processors for sending packets to and receiving packets from a client apparatus, and the client apparatus connected to the packet processors included in the redundancy node by a link, wherein the packet transfer program enables a computer to carry out a process for sending packets from one of the packet transfer units to one of the ringlets, and sending packets from the other packet transfer unit to the other ringlets, a process for duplicating packets received from the ringlets and distributing the received packets and the duplicate packets to the packet transfer units included in the redundancy node, a process for detecting an occurrence of a failure on each of the packet transfer units and the packet processors included in the redundancy node, and indicating the occurrence of the failure to each of the packet transfer units and the packet processors, a process for, when in a normal state, selecting packets output from one of the packet transfer units as packets to be sent to one of the ringlets, and selecting packets output from the other packet transfer unit as packets to be sent to the other ringlet, and when a failure occurs on either one of the packet transfer units included in the redundancy node, selecting packets output from the other packet transfer unit which is free of the failure as packets to be sent to the ringlet to which the packet transfer unit has sent packets, a process for outputting packets received from the client apparatus to the packet transfer units, and sending packets received from the ringlets by the packet transfer units to the client apparatus, a process for multiplexing packets received from the two packet transfer units, a process for permitting or inhibiting a transmission of packets received from the ringlets to the client apparatus depending on whether or not there is a failure, a process for connecting the redundancy node to the client apparatus through the link when in a normal state, and disconnecting the redundancy node from the client apparatus when a failure occurs, and a process for, when a failure occurs on one of the packet transfer units, outputting packets received from the client apparatus to the other packet transfer unit.

According to the present invention, the redundancy node includes two nodes having the same address, and the packet distributing means duplicates packets received from the ringlets and distributes the received packets and the duplicate packets to the nodes included in the redundancy node. Therefore, since the node which does not send packets receives packets, the node is kept in the same operational state as the node which sends packets. Consequently, in the event of a failure occurring on the node which sends packets, the other node can take over the operation while holding the operational state of the node which suffers the failure. As the redundancy node includes the output selecting means for selecting packets to be sent depending on whether there is a failure on each of the nodes or not, packets are prevented from being transmitted redundantly.

Each of the nodes included in the redundancy node includes the filtering means for permitting or inhibiting the transmission of packets received from the ringlets depending on whether there is a failure on the active node or not. Therefore, packets are prevented from being transmitted redundantly to the client apparatus.

According to the present invention, the redundancy node includes a node for sending packets to one of the ringlets as packets to be output from the redundancy node and a node for sending packets to the other ringlet as packets to be output from the redundancy node, and each of the nodes sends and receives packets to and from the client apparatus. Consequently, when in a normal state, both of the nodes can be used for communications with the client apparatus, and hence the efficiency with which to utilize resources is increased. As the redundancy node includes the output selecting means for selecting packets to be sent depending on whether there is a failure on each of the nodes or not, packets are prevented from being transmitted redundantly.

When a failure occurs on the link between the other node and the client apparatus, the filtering means permits packets received from any one of the ringlets to be sent to the client apparatus. Accordingly, packets are prevented from failing to be sent to the client apparatus.

According to the present invention, furthermore, the redundancy node includes two packet transfer units connected to the ringlets and a plurality of packet processors connected to the client apparatus. Each of the packet transfer units and the packet processors can thus have a redundant configuration. Particularly, if the redundancy node has three or more packet processors, then even in the event of a failure occurring on one of the packet processors, the band of the client apparatus for sending packets to and receiving packets from the ringlets is prevented from being reduced. In addition, as the redundancy node includes the output selecting means for selecting packets to be sent depending on whether there is a failure on each of the packet transfer units or not, packets are prevented from being transmitted redundantly.

Only the filtering means included in one of the packet processors permits packets received from one of the ringlets to be sent to the client apparatus. Only the filtering means included in another one of the packet processors permits packets received from the other ringlet to be sent to the client apparatus. When a failure occurs on the packet processor including the filtering means which permits packets received from one or the other ringlet to be sent to the client apparatus, only the filtering means included in still another one of the packet processors permits packets received from one or the other ringlet to be sent to the client apparatus. Accordingly, when in a normal state or when a failure occurs, packets are prevented from failing to be sent to the client apparatus.

ADVANTAGES OF THE INVENTION

According to the present invention, when a failure occurs on a node, a packet ring protective operation, a loss of packets in packet rings due to the packet ring protective operation, an effect on the traffic such as a packet route change, a consumption of CPU and memory resources, and a reduction in the ring transfer band can be avoided. The reasons for the avoidance of the above problems are that when a failure occurs on one of the nodes included in the redundancy node, the other node can take over the operation of the failing node while holding the operational status of the failing node.

According to the present invention, furthermore, a packet ring protective operation is avoided and a broadcast transfer due to addresses being not learned is avoided, so that the packet ring network system can recover stably and quickly from a failure.

If each of the nodes included in the redundancy node includes filtering means for permitting or inhibiting the transmission of packets received from the ringlets depending on whether there is a failure on the node or not, then packets are prevented from being transmitted redundantly to the client apparatus.

If the filtering means is arranged to permit packets received from any one of the ringlets to be sent to the client apparatus when a failure occurs on the link between the other node and the client apparatus, then packets are prevented from failing to be sent to the client apparatus.

If only the filtering means included in one of the packet processors is arranged to permit packets received from one of the ringlets to be sent to the client apparatus, then packets are prevented from being transmitted redundantly to the client apparatus.

DESCRIPTION OF REFERENCE CHARACTERS

Figure 1:
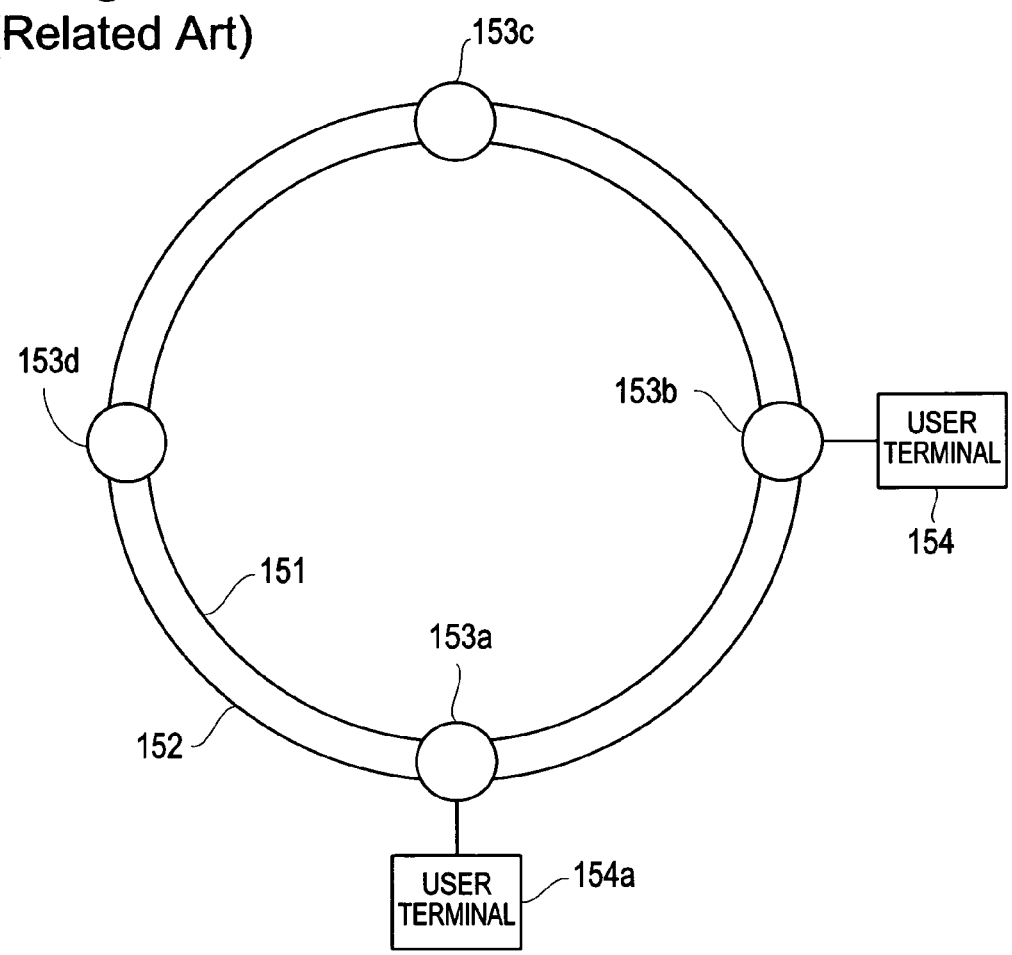
FIG. 1 is a diagram showing a configurational example of an RPR network.
Figure 2:
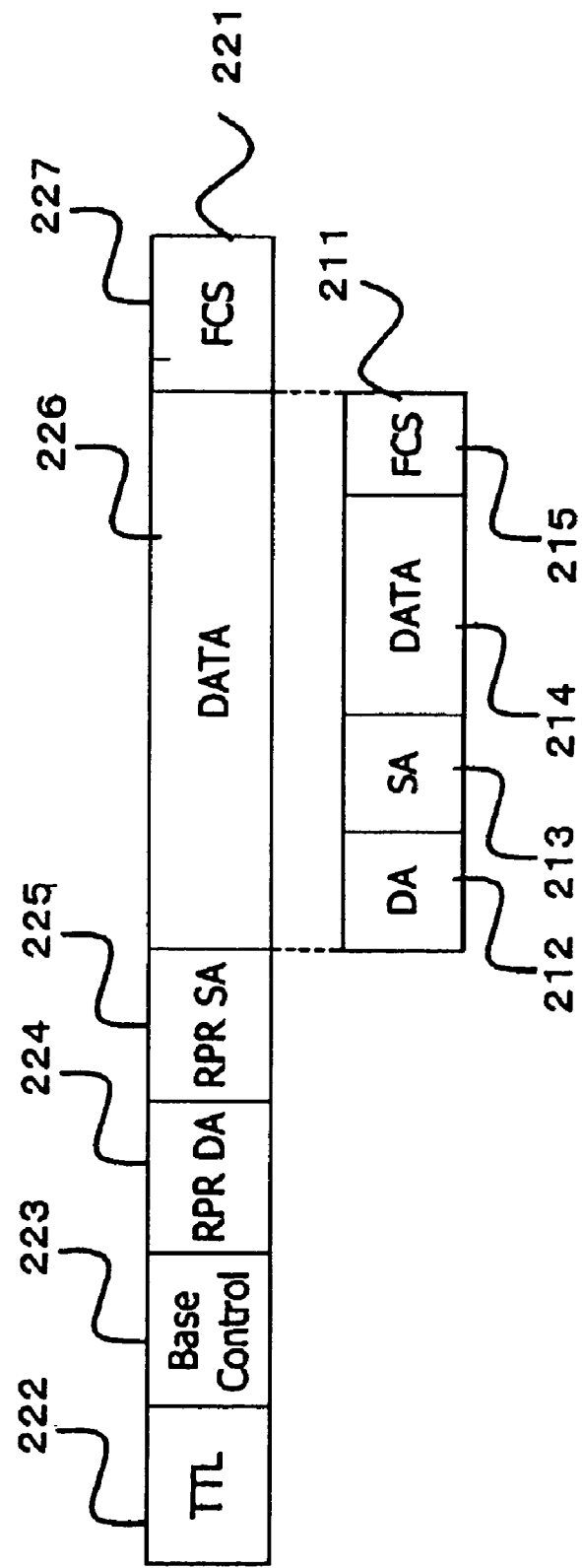
FIG. 2 is a diagram showing an RPR format.

62 filter circuit
103*a*, 103*b* distributor 104a, 104b selector
105a, 105b node
105c, 105d packet transfer unit
105e, 105f packet processor
106 node failure detecting and indicating circuit
107 selector control circuit
108 E/O converter
109 O/E converter
111 redundancy node
102 client apparatus
120 ringlet-0
121 ringlet-1
401, 402 forwarding circuit
403, 404, 405 multiplexing circuit
406 ringlet selecting circuit
407 topology managing circuit
430 Add selector switch
412 address table
411 packet converting circuit
420 control packet processing circuit
431, 432 selector

BEST MODE FOR CARRYING OUT THE INVENTION

1st Exemplary Embodiment

Figure 6:
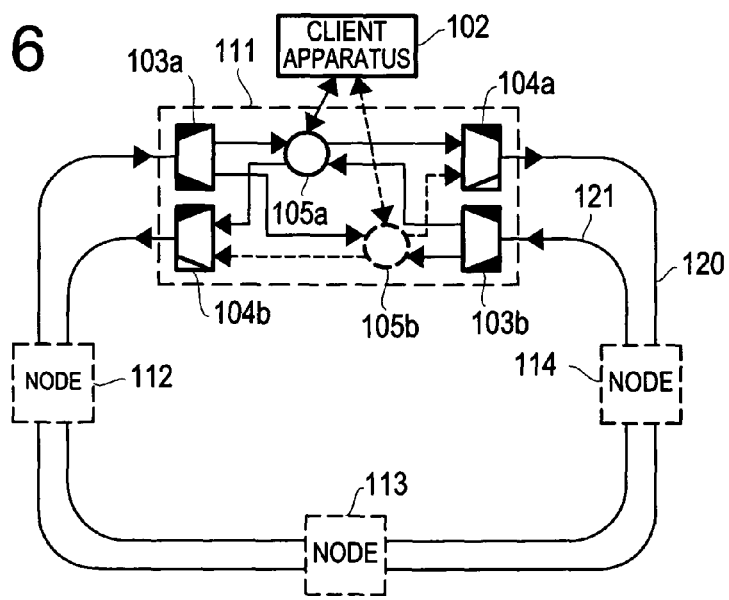
FIG. 6 is a diagram showing a configurational example of a packet ring network system according to a first exemplary embodiment of the present invention.

A first exemplary embodiment of the present invention will be described below with reference to the drawings. FIG. 6 is a diagram showing a configurational example of a packet ring network system according to a first exemplary embodiment of the present invention.

The packet ring network system according to the present invention includes a packet ring (ringlets 120, 121) including nodes interconnected in a ring configuration (ringlet 120 will be referred to as ringlet-0 and ringlet 121 as ringlet-1). The packet ring network system includes redundancy nodes 111 through 114 each including a redundant combination of two RPR nodes (hereinafter referred to simply as nodes) 105a, 105b having the same address, distributors (packet distributing means) 103a, 103b, and selectors (output selecting means) 104a, 104b. A combination of two nodes will hereinafter be referred to as a redundancy node.

In the example shown in FIG. 6, there are four combinations of two nodes. However, the combinations of the nodes of the packet ring network system are not limited to four combinations. Node 105a serves as an active node (indicated by the solid line in the example shown in FIG. 6), and node 105b as a backup node (indicated by the dotted line in the example shown in FIG. 6), the nodes being connected to client apparatus 102 by respective links. When the packet ring network system is normal, communications between node 105a and client apparatus 102 are valid (the link is in operation), and communications between node 105b and client apparatus 102 are invalid (no communications are performed).

Figure 7:
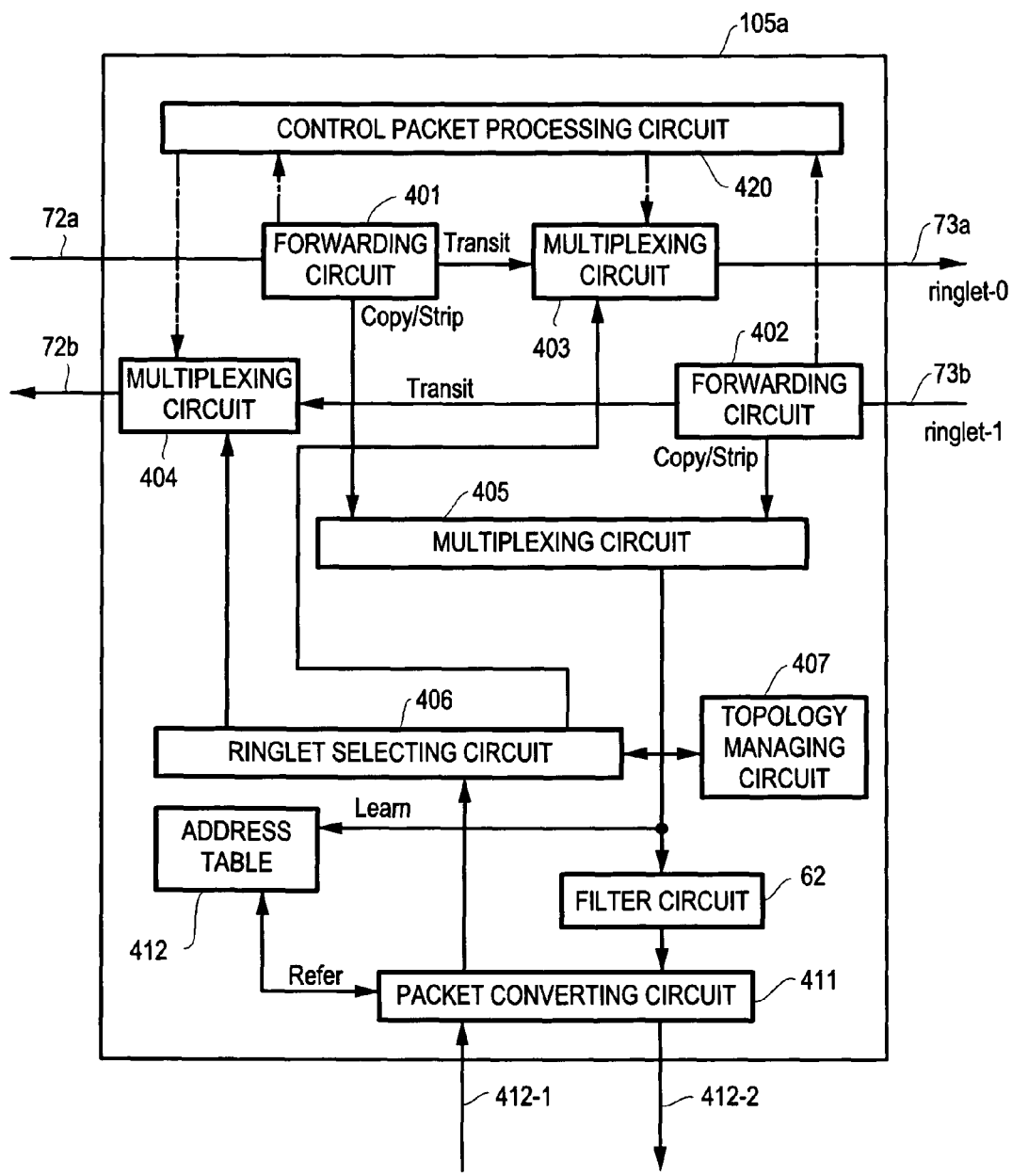
FIG. 7 is a block diagram showing a configurational example of a node of a redundancy node according to the first exemplary embodiment of the present invention.

FIG. 7 is a block diagram showing a configurational example of a node of a redundancy node according to the first exemplary embodiment of the present invention.

Node 105a includes forwarding circuit 401 and multiplexing circuit (multiplexing means) 403 which are associated with ringlet-0 and forwarding circuit 402 and multiplexing circuit (multiplexing means) 404 which are associated with ringlet-1. Forwarding circuit 401 is connected to ringlet-0 by link 72a and multiplexing circuit 403 is connected to ringlet-0 by link 73a. Forwarding circuit 402 is connected to ringlet-1 by link 73b and multiplexing circuit 403 is connected to ringlet-1 by link 72b. Tributary ports (client apparatus connecting means) 412-1, 4122 are connected to client apparatus 102. Client apparatus 102 sends and receives packets to and from nodes connected to the ringlets via tributary ports 412-1, 4124 (in other words, via redundancy node 11).

Forwarding circuits 401, 402 refer to the RPR MAC DA of an RPR packet transferred thereto. If the RPR MAC DA is the same as the RPR MAC address of their own node, then forwarding circuits 401, 402 remove the RPR packet from ringlet-0 or ringlet-1 and transfer the RPR packet to client apparatus 102. The process of removing (deleting) a packet transferred from a ringlet from the ring and transferring the packet to client apparatus 102 will be referred to as "strip".

If the transferred RPR packet is a broadcast packet, then forwarding circuits 401, 402 transfer the broadcast packet to client apparatus 102 and to the ringlets. The process of transferring a packet transferred from a ringlet to the ringlet will be referred to as "transit". The process of transferring a packet transferred from a ringlet to the ringlet and also transferring it to client apparatus 102 will be referred to as "copy".

If the transferred RPR packet is not applicable to either of the above cases, then forwarding circuits 401, 402 transfer the packet to the same ringlet as the ringlet it was transferred from (Transit). Multiplexing circuit 405 multiplexes packets which have been received from the ringlets (forwarding circuits 401, 403) and which will be transferred to client apparatus 102.

Address table 412 stores the MAC address of the user terminal (client apparatus 102) and the RPR MAC addresses of the nodes of the ring in association with each other. Address table 412 functions as an FDB. Packet converting circuit 411 receives packets to be transferred to client apparatus 102 from the ringlets via respective forwarding circuits 401, 402.

Packet converting circuit 411 receives an RPR packet and removes a user data packet from the RPR packet (in other words, decapsulates the user data packet). Packet converting circuit 411 sends the removed user data packet through tributary port 412-2 to client apparatus 102. Packet converting circuit 411 learns the association between the RPR MAC SA of the received RPR packet and the MAC SA of the removed user data packet, and records the association in address table 412. The MAC SA of the removed user data packet represents the MAC address of client apparatus 102 to which packet converting circuit 411 has sent the user data packet.

Packet converting circuit 411 receives a user data packet from client apparatus 102 through tributary port 412-1. At this time, packet converting circuit 411 refers to address table 412 and tries to retrieve an RPR MAC address corresponding to the MAC DA of the received user data packet. If there is an entry (i.e., if packet converting circuit 411 successfully retrieves an RPR MAC address), then packet converting circuit 411 encapsulates the user data packet using the retrieved RPR MAC address as an RPR MAC DA.

If there is no entry (i.e., if packet converting circuit 411 unsuccessfully retrieves an RPR MAC address), then packet converting circuit 411 encapsulates the user data packet using a broadcast address as an RPR MAC DA (in this case, packet converting circuit 411 generates an unknown unicast packet). Packet converting circuit 411 outputs the encapsulated packet with the RPR MAC DA to ringlet selecting circuit (ringlet selecting means) 406.

The unknown unicast packet refers to an RPR packet with an RPR MAC DA set as a broadcast address because when a user data packet is encapsulated into an RPR packet, an RPR MAC address corresponding to the MAC DA of the user data packet cannot be retrieved from the address table.

If a packet sent from packet converting circuit 411 is a unicast packet, then ringlet selecting circuit 406 refers to topology managing circuit 407, selects a ringlet through which a destination node can be reached along a shortest route, sets a TTL value, and outputs the packet to a multiplexing circuit that is associated with the selected ringlet. If a packet sent from packet converting circuit 411 is a broadcast packet (including an unknown unicast packet), then ringlet selecting circuit 406 selects a ringlet according to a predetermined transfer method (unidirectional flooding or bidirectional flooding), sets a TTL value, and outputs the packet to a multiplexing circuit that is associated with the selected ringlet.

Topology managing circuit 407 stores and manages the RPR MAC addresses of the nodes, including its own node, arranged clockwise on the ring, and also the RPR MAC addresses of the nodes arranged counterclockwise on the ring.

Multiplexing circuit 403 multiplexes a packet received from client apparatus 102 and a packet received from ringlet-0 (a packet output by forwarding circuit 401), and sends a multiplexed packet to ringlet-0. Multiplexing circuit 404 multiplexes a packet received from client apparatus 102 and a packet received from ringlet-1 (a packet output by forwarding circuit 402), and sends a multiplexed packet to ringlet-1.

Figure 3:
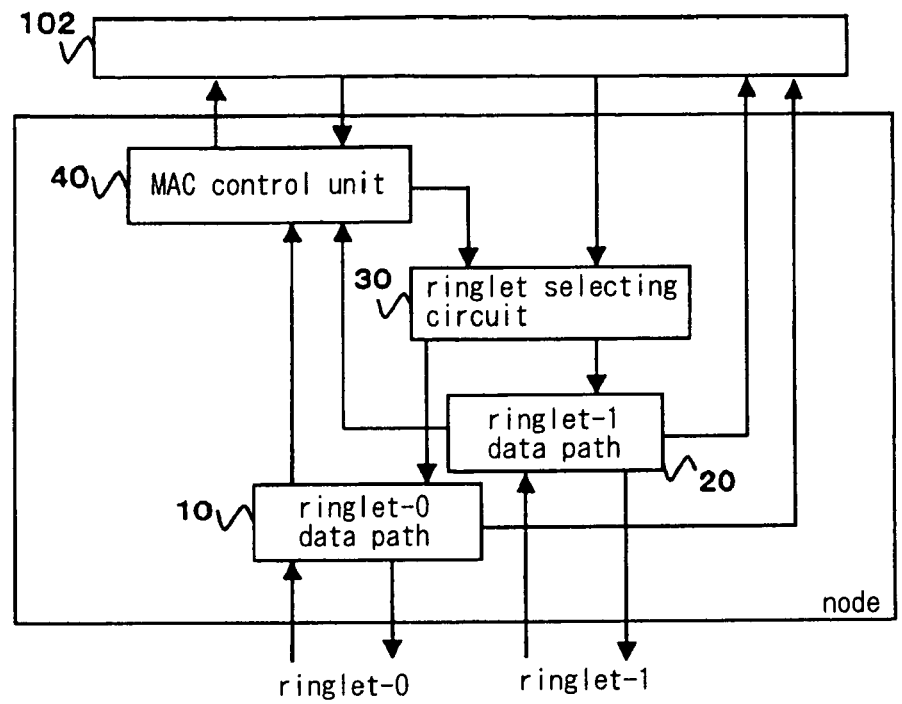
FIG. 3 is a diagram showing a configurational example of a node in a packet ring network according to the background art.
Figure 4A:
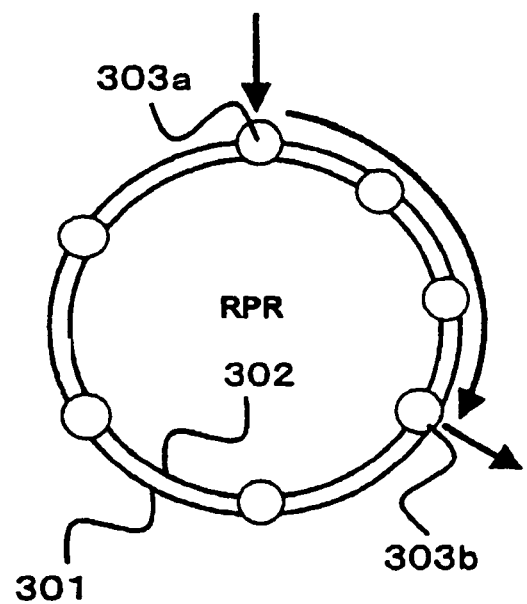
FIG. 4A is a diagram showing an example of a packet ring network in the event of a failure of a link.
Figure 4B:
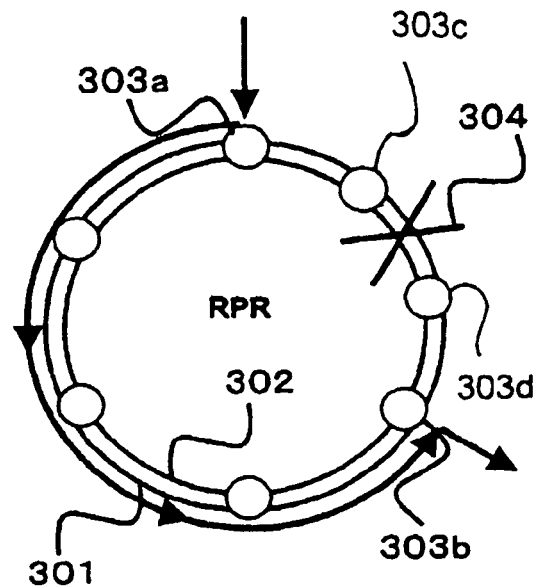
FIG. 4B is a diagram showing an example of a packet ring network in the event of a failure of a link.
Figure 4C:
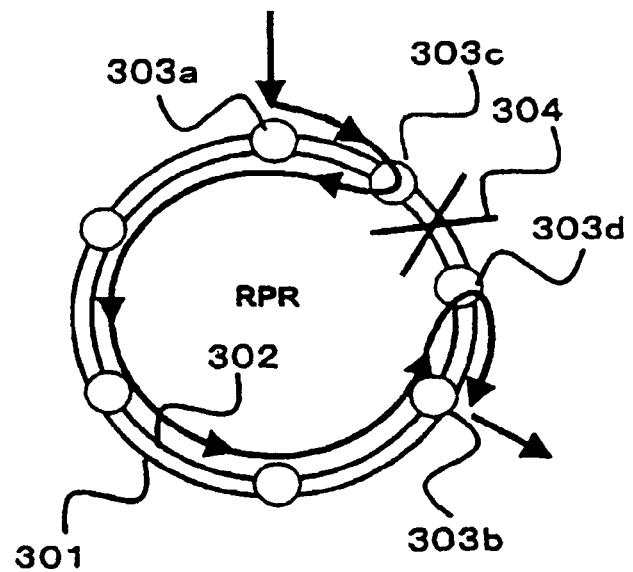
FIG. 4C is a diagram showing an example of a packet ring network in the event of a failure of a link.
Figure 5A:
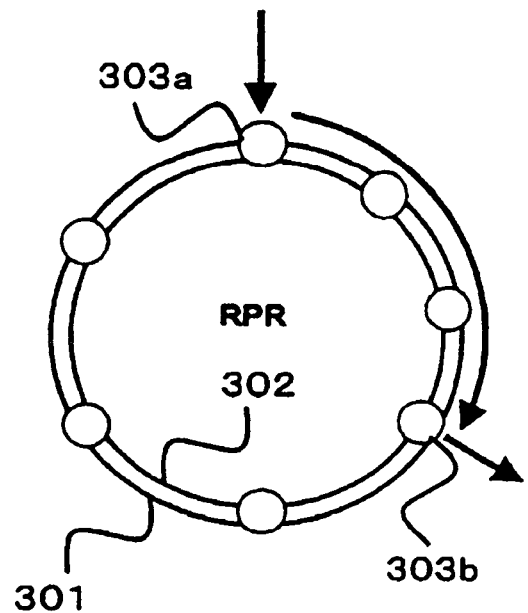
FIG. 5A is a diagram showing an example of a packet ring network in the event of a failure of a node.
Figure 5B:
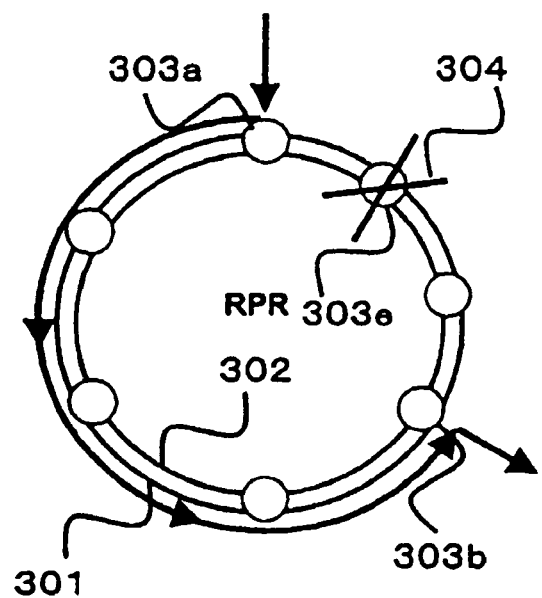
FIG. 5B is a diagram showing an example of a packet ring network in the event of a failure of a node.
Figure 5C:
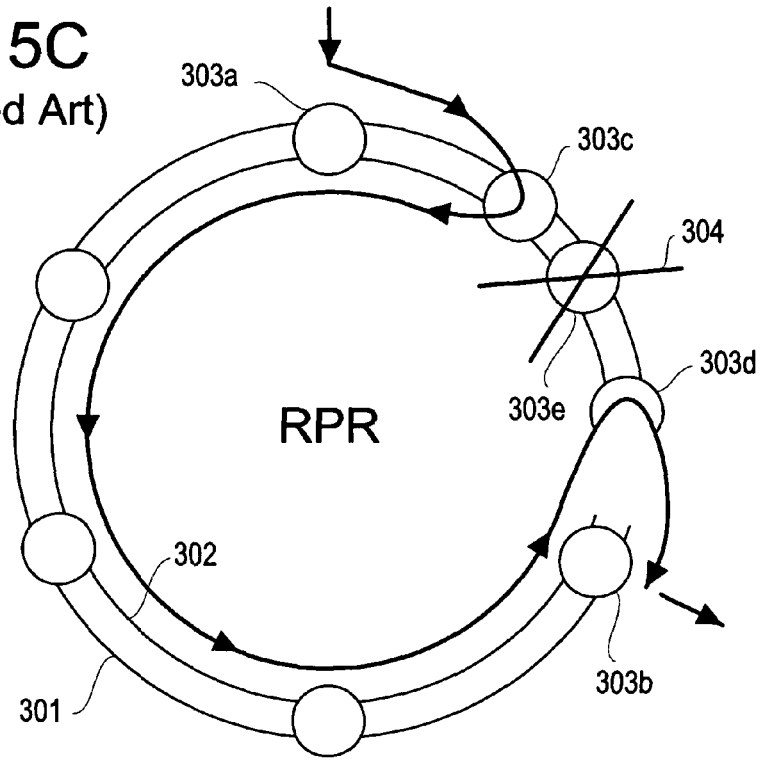
FIG. 5C is a diagram showing an example of a packet ring network in the event of a failure of a node.
Figure 8:
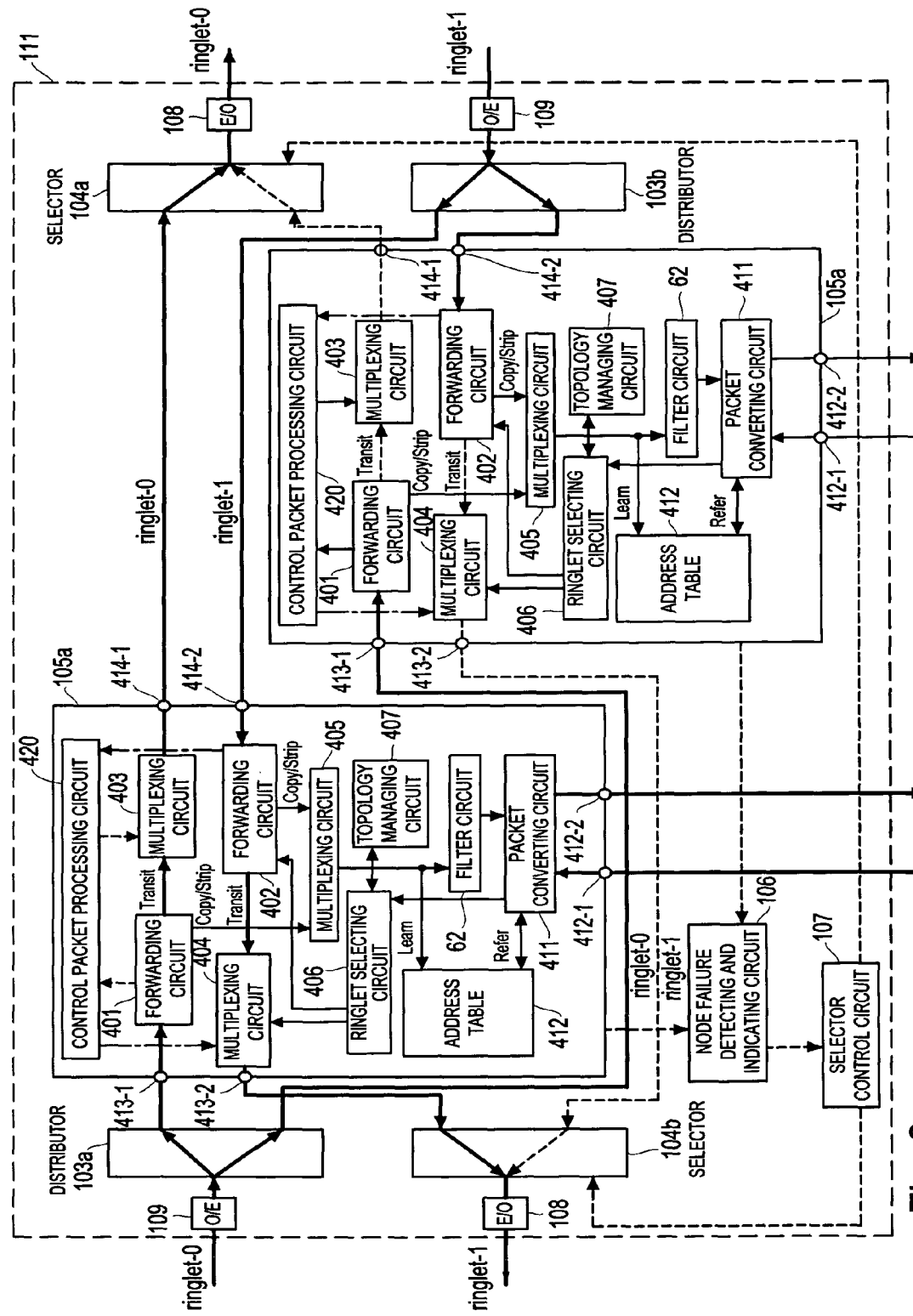
FIG. 8 is a block diagram showing a configurational example of the redundancy node according to the first exemplary embodiment of the present invention.

FIG. 8 is a block diagram showing a configurational example of redundancy node 111 according to the first exemplary embodiment of the present invention. Redundancy node 111 includes nodes 105*a*, 105*b* having the RPR packet transferring function and the RPR packet processing function shown in FIG. 3, distributors 103*a*, 103*b*, selectors 104*a*, 104*b*, electro-optical signal converters (E/O converter) 108, opto-electrical signal converters (O/E converter) 109, node failure detecting and indicating circuit (failure detecting and indicating means) 106, and selector control circuit 107.

In the description of the first exemplary embodiment below, node 105*a* will be described as an active node, and node 105*b* as a backup node. Such a node setting is made by a higher-level provisioning setting process performed at the time the apparatus (redundancy node 111) is activated. Specifically, an information processing apparatus (not shown) such as a personal computer or the like is provided which is connected to a node for which settings are to be made. The information processing apparatus (a personal computer in the present example) makes various settings for the node. When the ring network system undergoes configurational changes, the personal computer changes the node settings depending on the configurational changes of the ring network system.

It is assumed that nodes 105*a*, 105*b* have the same function and capabilities. Distributors 103*a*, 104*b*, each of which has a single input port and two output ports, duplicate packets which have been received from the ringlets by redundancy node 111 and output from opto-electrical signal converters 109, and supply (distribute) the duplicated packets to both nodes 105*a*, 105*b*. To duplicate a packet means to generate the same packet as the packet that is input.

Node failure detecting and indicating circuit 106 monitors operating statuses of nodes 105*a*, 105*b*, and, if the nodes suffer a failure, indicates the occurrence of the failure to the nodes and selector control circuit 107. Specifically, node failure detecting and indicating circuit 106 generates failure information representative of the occurrence of a failure, the contents of a failure that has occurred, etc., and outputs the generated failure information to the nodes and selector control circuit 107. When node failure detecting and indicating circuit 106 indicates to selector control circuit 107 that a failure has occurred on node 105*a* or node 105*b*, selector control circuit 107 outputs a control signal to control selectors 104*a*, 104*b* to select an appropriate input signal (packet). Selectors 104*a*, 104*b*, each of which has two input ports, a single output port, and a single control signal input port, select an input signal (packet) to be output to the output port based on the supplied control signal.

When a failure occurs, tributary ports 412-1, 412-2 disconnect redundancy node 111 from client apparatus 102.

Though redundancy node 111 has been described above as including the circuits such as forwarding circuits 401, 402, etc., redundancy node 111 may comprise a computer programmed to perform the same operation as those circuits.

If redundancy node 111 includes a computer, then it may have a packet transfer program for enabling the computer to carry out a packet distributing process for duplicating packets received from the ringlets and distributing the received packets and the duplicate packets to the nodes included in the redundancy node, a failure detecting and indicating process for detecting the occurrence of a failure on each of the nodes included in the redundancy node and indicating the occurrence of the failure to each of the nodes, an output selecting process for, when a failure occurs on one of the nodes, selecting packets output from the other node as packets to be sent from the redundancy node, and when in a normal state, selecting packets output from one of the nodes as packets to be sent from the redundancy node, and a client apparatus connecting process for connecting the redundancy node to a client apparatus when in a normal state, and disconnecting the redundancy node from the client apparatus when a failure occurs.

Figure 9:
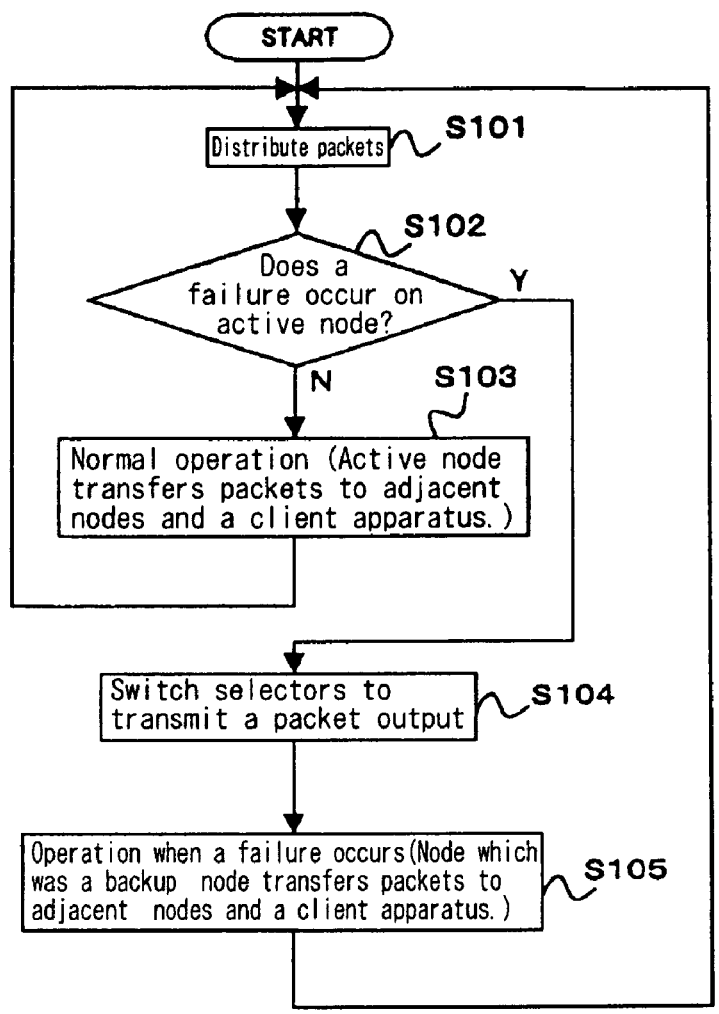
FIG. 9 is a flowchart of an operation sequence of the first exemplary embodiment of the present invention.

Operation of the first exemplary embodiment of the present invention will be described below with reference to the drawings. FIG. 9 is a flowchart of an operation sequence of the first exemplary embodiment of the present invention. In the description which follows, node 105*a* is used as an active node and node 105*b* as a backup node. However, node 105*b* may be used as an active node and node 105*a* as a backup node.

Irrespective of whether the nodes are normal or suffer a failure, distributors 103*a*, 103*b* supply (distribute) packets received from the ringlets by redundancy node 111 to both nodes 105*a*, 105*b* at all times (step S101). Therefore, forwarding circuits 402 of nodes 105*a*, 105*b* are in a state for receiving packets at all times. If node failure detecting and indicating circuit 106 does not detect a failure of active node 105*a* (N in step S102), then nodes 105*a*, 105*b* perform an RPR packet processing operation (normal operation) according to IEEE 802.17 (step S103).

Operation of active node 105*a* when it is normal will be described below. Active node 105*a* is fixedly connected to client apparatus 102 by a distributed protocol such as link aggregation. Therefore, packets received from the ringlets are transferred through multiplexing circuit 405, filter circuit (filtering means) 62, and packet converting circuit 411 to client apparatus 102.

If a failure occurs on active node 105*a*, then tributary port 412-2 of node 105*a* blocks an optical output signal, causing client apparatus 102 to send and receive packets to and from backup node 105*b* autonomously. Packets output from multiplexing circuits 403, 404 of active node 105*a* are transferred to adjacent nodes through selectors 104*a*, 104*b*. In the normal operation, as described above, active node 105*a* transfers packets according to IEEE 802.17 through its connections established with other RPR nodes by the distributors and the selectors.

Operation of backup node 105*b* when it is normal will be described below. As described above, backup node 105*b* is receiving the same packets as the RPR packets which are received by active nodes 105*a* through distributors 103*a*, 10*b*, at all times. Therefore, backup node 105*b* operates to receive packets from the ringlets to the tributary (client apparatus 102) in the same manner as active node 105a.

Forwarding circuits 401, 402 determine whether a packet is to be copied or dropped, and learn addresses in address table 412 through multiplexing circuit 405. According to this operation, the address table of backup node 105b holds the same entries as the address table of active node 105a, so that broadcasts due to addresses being not learned are prevented from being made when the backup node switches to the active node.

Filter circuit 62 of backup node 105b blocks the transmission of packets to the tributary (client apparatus 102), thereby preventing packets from being redundantly transmitted to client apparatus 102. Forwarding circuits 401, 402 output control packets to control packet processing circuit 420. Control packet processing circuit 420 performs a process depending on the control packets. Specifically, control packet processing circuit 420 receives a TP (Topology and Protection) frame which is a control frame from all other RPR nodes, and holds a topology database in topology managing circuit 407. Since the received TP frame is identical to a TP frame received by active node 105a, the generated topology database is the same as the topology database of the active node.

In the normal operation, tributary port 412-1 of node 105b does not receive packets. Therefore, there are no packets sent from tributary port 412-1 through packet converting circuit 411, ringlet selecting circuit 406, and multiplexing circuits 403, 404 to the RPR.

The packets sent by multiplexing circuits 403, 404 include packets transited by forwarding circuits 401, 402 and packets sent by control packet processing circuit 420. Consequently, multiplexing circuits 403, 404 of backup node 105b send packets through ports 414-1, 413-2 of node 105b to selectors 104a, 104b as with the multiplexing circuits of active node 105a.

Since selectors 104a, 104b have selected packets output from output ports 414-1, 413-2 of active node 104b as packets to be sent from redundancy node 111, selectors 104a, 104b discard the packets output from backup node 105b. As described above, backup node 105b operates in the same manner as with active node 105a except that backup node 105b does not send and receive packets to and from client apparatus 102 through the tributary ports and packets output from multiplexing circuits 403, 404 are not sent from redundancy node 111 to the other RPR nodes.

Operation of backup node 105b when a failure occurs on active node 105a will be described below. In this case, node 105b which is a backup node in the normal operation becomes an active node. If node failure detecting and indicating circuit 106 detects a failure of active node 105a (Y in step S102), node failure detecting and indicating circuit 106 causes selector control circuit 107 to switch selectors 104a, 104b to transmit a packet output from backup node 105b (step S104). Selectors 104a, 104b select the packet output from backup node 105b which has changed from a backup node to an active node as a packet to be transmitted from redundancy node 111, and transmit the packet to the other RPR nodes (step S105).

Client apparatus 102 detects the blocking of an optical output signal by the tributary port 412-2 of node 105a, and starts communicating with tributary port 412-2 of node 105b. When filter circuit 62 of node 105b detects the failure of node 105b which has been an active node, filter circuit 62 cancels the filtering of packets, and transfers packets transferred from multiplexing circuit 405 to tributary node 412-2. In other words, node 105b sends packets to and receives packets from client apparatus (step S105). Node 105b thus operates as an active node.

In order to bring the sequence numbers in the topology databases defined by IEEE 802.17 into agreement with each other in nodes 105a, 105b of redundancy node 111, TTL values are established such that a TP frame transmitted by the active node can pass through the ringlets and can be received by the backup node in the source redundant packet ring node. The backup node receives the TP frame transmitted by the active node, and reflects the sequence number in the TP frame in the sequence number the topology database of the backup node.

According to the present exemplary embodiment, as described above, when a failure occurs on the active node, a packet ring protective operation, a loss of packets in packet rings due to the packet ring protective operation, an effect on the traffic such as a packet route change, a consumption of CPU and memory resources, and a reduction in the ring transfer band can be avoided.

According to the present exemplary embodiment, furthermore, since a packet ring protective operation is avoided and a broadcast transfer due to addresses being not learned is avoided, the packet ring network system can recover stably and quickly from a failure. The reasons for the stable and quick recovery are that inasmuch as the topology database and the address learning table of one node are kept in agreement with those of the other node when in a normal state, even when a failure occurs on one of the nodes, the other node can refer to the database and address table which are essentially identical to those of the node suffering the failure.

2nd Exemplary Embodiment

Figure 10:
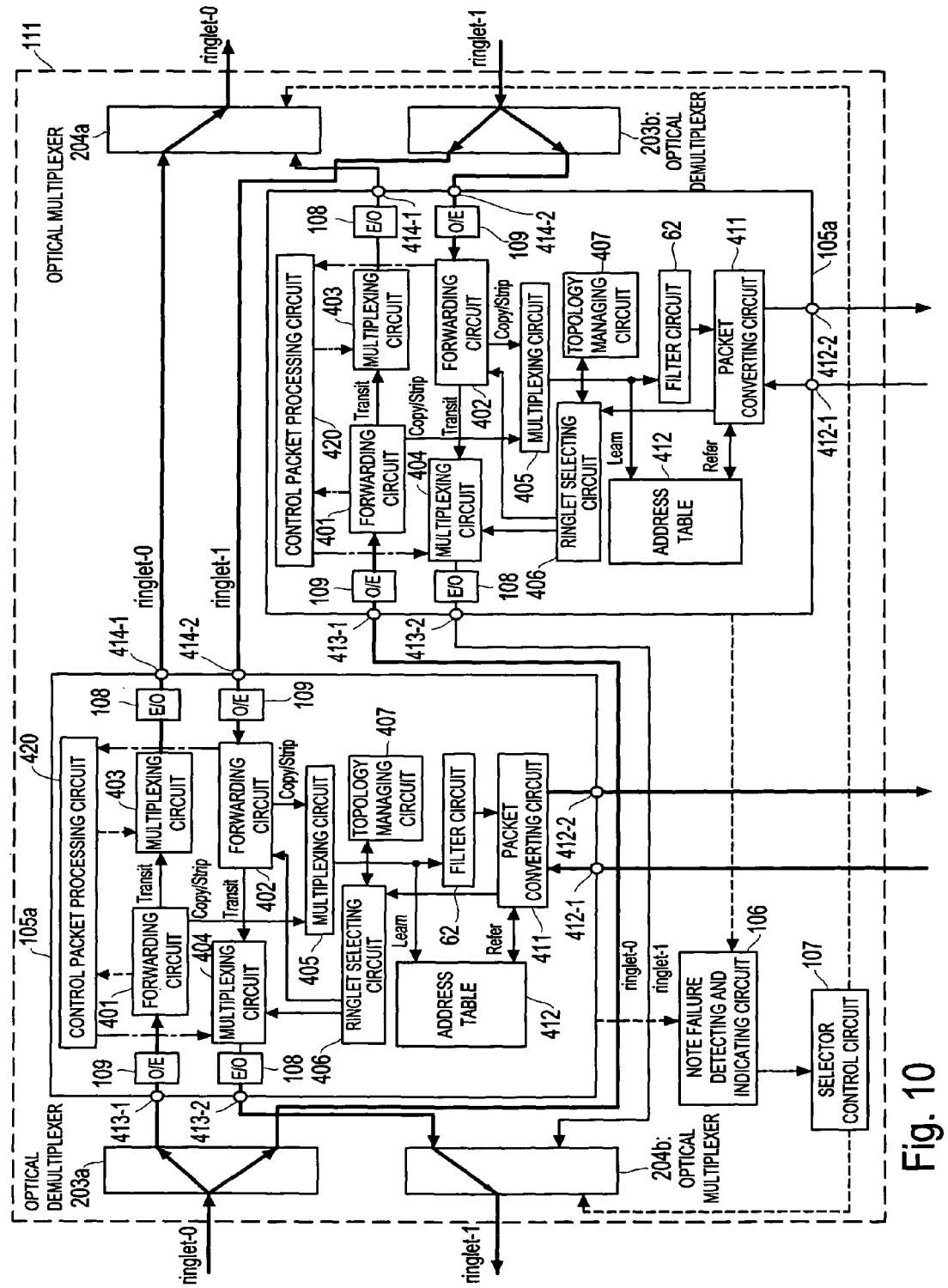
FIG. 10 is a diagram showing a configurational example of a packet ring network system according to a second exemplary embodiment of the present invention.

A second exemplary embodiment of the present invention will be described below with reference to the drawings. FIG. 10 is a diagram showing a configurational example of a packet ring network system according to a second exemplary embodiment of the present invention.

In the second exemplary embodiment, each of nodes 105a, 105b includes O/E converters 109 for converting an electric signal into an optical signal and E/O converters 108 for converting an optical signal into an electric signal.

O/E converter 109 receives an optical signal packet from a ringlet, converts the optical signal packet into an electric signal packet, and outputs the electric signal packet to forwarding circuit 402. E/O converter 108 converts an electric signal packet output from multiplexing circuit 404 into an optical signal packet, and transmits the optical signal packet to a ringlet.

Redundancy node 111 includes optical demultiplexers 203a, 203b for distributing an optical signal received from a ringlet to nodes 105a, 105b. Redundancy node 111 also includes optical multiplexers 204a, 204b for multiplexing optical signals sent from E/O converters 108 of nodes 105a, 105b. The E/O converters of each node transmit an optical signal only when the node operates as an active node, and do not transmit an optical signal when the node operates as a backup node. Therefore, redundancy node 111 transmits only optical signal transmitted by the active node to a ringlet.

In redundancy node 111, one of the nodes of redundancy node 111 transmits a TP frame to one of the ringlets, and all the nodes except for its own node receive the transmitted TP frame. The other node of redundancy node 111 transmits a TP frame to the other ringlet, and all the nodes except for its own node receive the transmitted TP frame.

The reasons for the above operation will be described below. In order for the two nodes of redundancy node 111 to keep their topology databases according to IEEE 802.17 in conformity with each other, each of the nodes manages a TP frame transmitted by the other nodes except for its own node with a topology database (topology managing circuit 407) with respect to each ringlet from which the TP frame is received. Therefore, topology managing circuit 407 of each of nodes 105a, 105b receives TP frames transmitted by the other nodes except for its own node, from ringlet-0 and ringlet-1, and manages the sequence numbers stored in the respective TP frames separately with respect to the ringlets.

Advantages of the present exemplary embodiment will be described below. Distributors 103a, 103b and selectors 104a, 104b for electric signals according to the first exemplary embodiment are replaced with optical demultiplexers 203a, 203b and optical multiplexers 204a, 204b, respectively, and nodes 105a, 105b include O/E converters 109 and E/O converters 108. Functions to distribute and select main signals (packets) can thus be realized by a structurally simple, inexpensive device such as an optical coupler. Therefore, the present exemplary embodiment offers the same advantages as those of the first exemplary embodiment.

3rd Exemplary Embodiment

Figure 11:
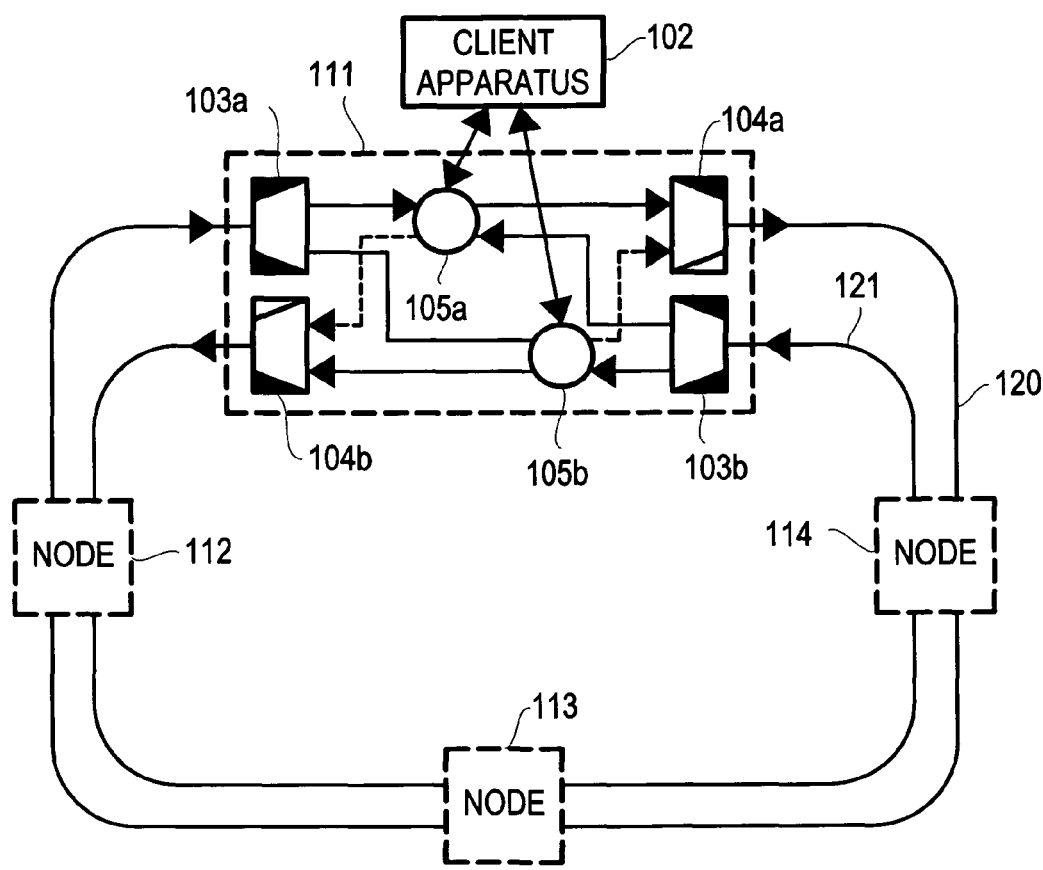
FIG. 11 is a diagram showing a configurational example of a packet ring network system according to a third exemplary embodiment of the present invention.

A third exemplary embodiment of the present invention will be described below with reference to the drawings. FIG. 11 is a diagram showing a configurational example of a packet ring network system according to a third exemplary embodiment of the present invention.

In the first exemplary embodiment and the second exemplary embodiment, as shown in FIG. 6, node 105a serves as an active node (indicated by the solid line), and node 105b as a backup node (indicated by the dotted line in the example shown in FIG. 6). According to the third exemplary embodiment, as shown in FIG. 11, both nodes 105a, 105b serve as active nodes (indicated by the solid line).

When the packet ring network system is normal, node 105a receives packets from both ringlet-0 and ringlet-1, and sends packets only to ringlet-0. Similarly, node 10ba receives packets from both ringlet-0 and ringlet-1, and sends packets only to ringlet-1. Nodes 105a, 105b are connected to respective client apparatus 102.

Figure 12:
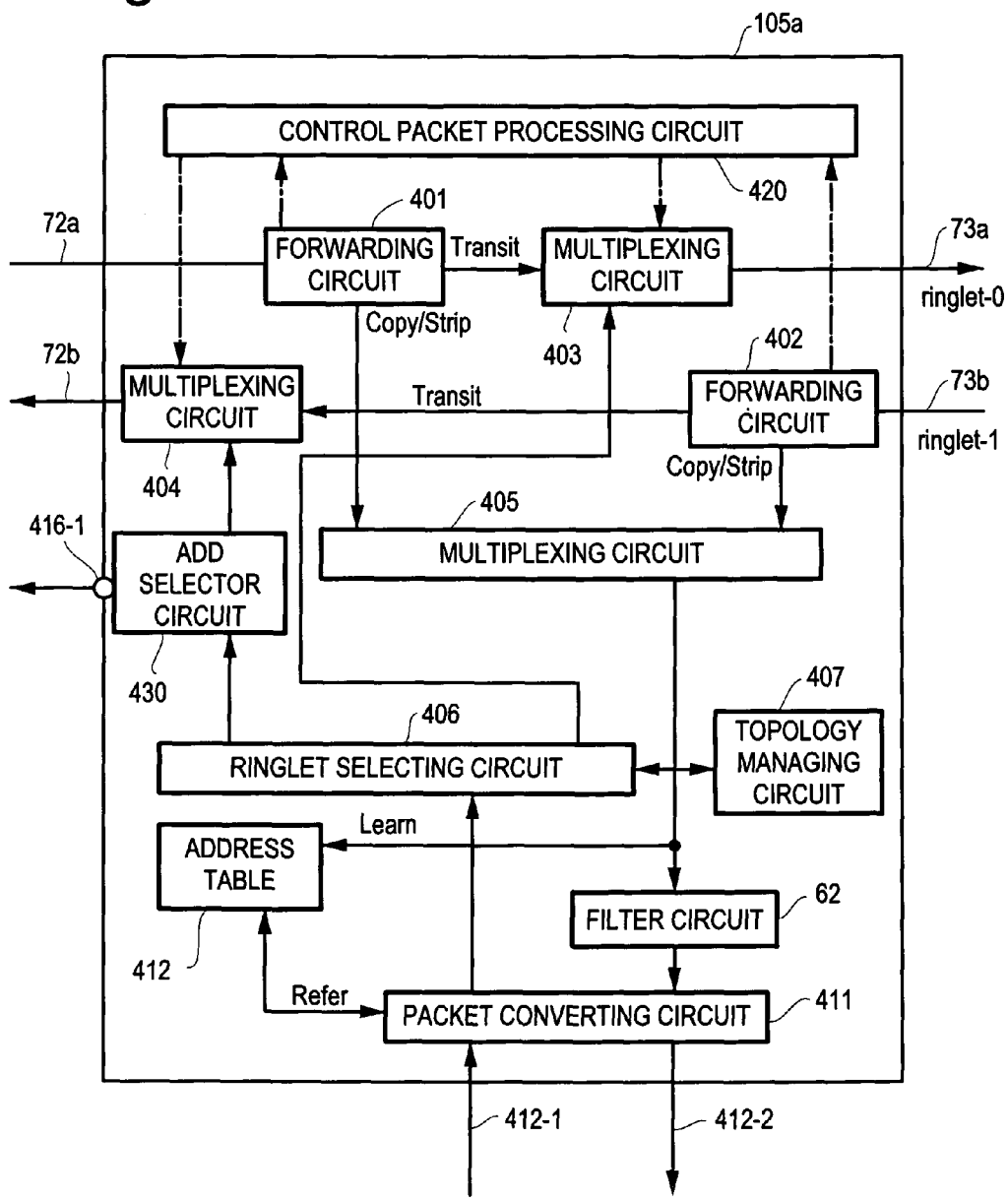
FIG. 12 is a block diagram showing a configurational example of a node included in a redundancy node according to the third exemplary embodiment of the present invention.

FIG. 12 is a block diagram showing a configurational example of a node included in redundancy node 111 according to the third exemplary embodiment of the present invention. The configuration according to the third exemplary embodiment differs from the first exemplary embodiment in that each node includes Add selector switch (output switching means) 430 for transferring packets to other nodes dependent on the selection made by ringlet selecting circuit 406. Add selector switch 430 will hereinafter referred to as Add selector SW 430.

When the packet ring network system is normal, ringlet selecting circuit 406 of node 105a selects multiplexing circuit 404 of node 105b as a multiplexing circuit for multiplexing packets onto ringlet-1. Add selector SW 430 then transfers packets to node 105b.

When a failure occurs on node 105b, ringlet selecting circuit 406 of node 105a selects multiplexing circuit 404 of its own node as a multiplexing circuit for multiplexing packets onto ringlet-1. Add selector SW 430 outputs packets to multiplexing circuit 404 of its own node.

Figure 13:
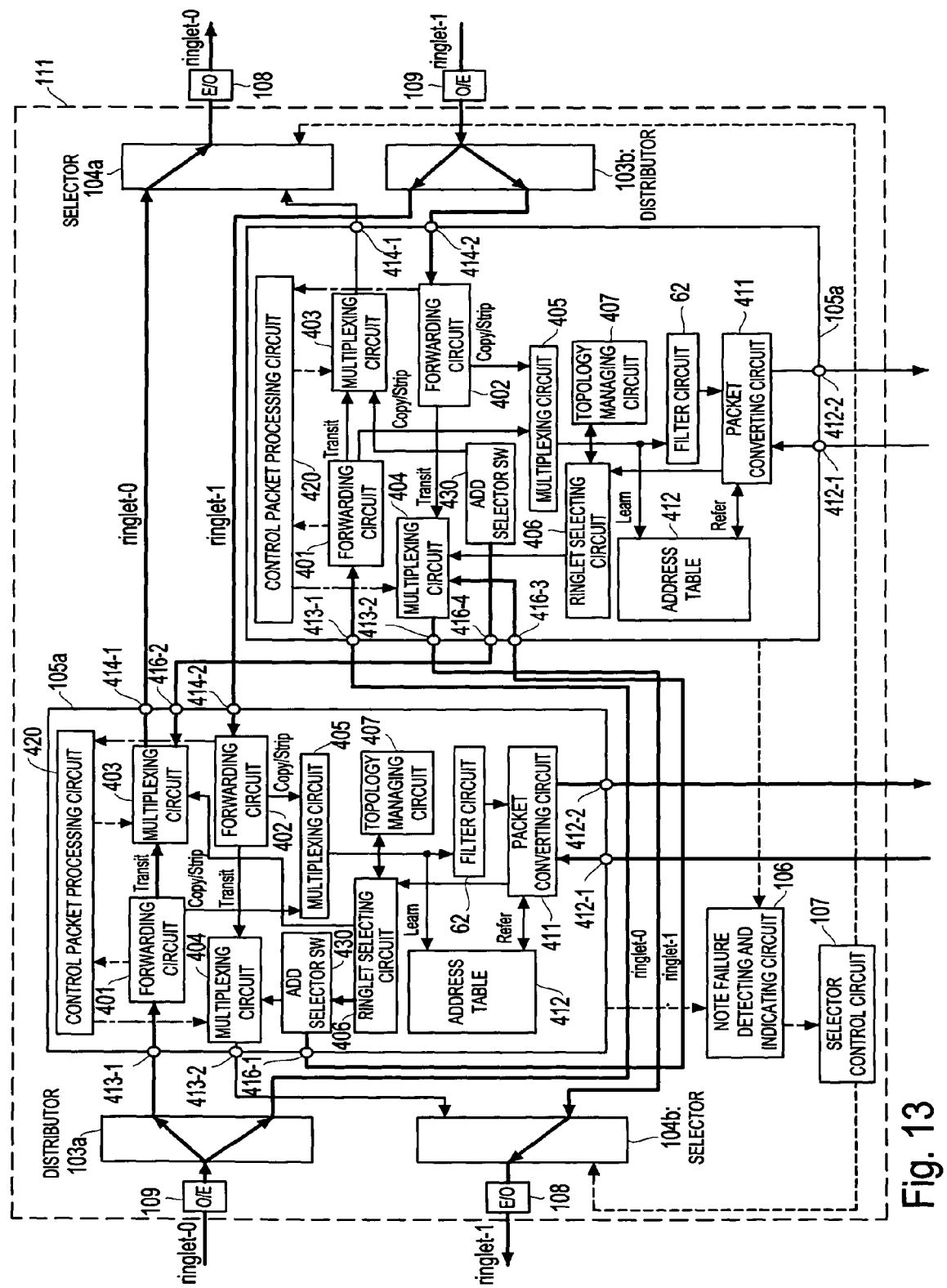
FIG. 13 is a block diagram showing a configurational example of the redundancy node according to the third exemplary embodiment of the present invention.

FIG. 13 is a block diagram showing a configurational example of redundancy node 111 according to the third exemplary embodiment of the present invention. Multiplexing circuit 104 of node 105b multiplexes packets transferred through Add selector SW 430 of node 105a onto ringlet-1.

In the third exemplary embodiment, when the packet ring network system is normal, multiplexing circuit 403 of node 105a multiplexes packets received from client apparatus 102 (packets transferred through Add selector SW 430 of node 105b and packets output from ringlet selecting circuit 406 of node 105a), and packets received from ringlet-0 (packets output from forwarding circuit 401), and transmits the multiplexed packet to ringlet-0.

When a failure occurs on node 105b, multiplexing circuit 403 of node 105a multiplexes packets received from client apparatus 102 (packets output from ringlet selecting circuit 406 of node 105a), and packets received from ringlet-0 (packets output from forwarding circuit 401), and transmits the multiplexed packet to ringlet-0. When a failure occurs on node 105b, multiplexing circuit 404 of node 105a multiplexes packets received from client apparatus 102 (packets output from Add selector SW 430 of node 105a), and packets received from ringlet-1 (packets output from forwarding circuit 402), and transmits the multiplexed packet to ringlet-1.

In the third exemplary embodiment, when the packet ring network system is normal, multiplexing circuit 403 of node 105b multiplexes packets received from client apparatus 102 (packets transferred through Add selector SW 430 of node 105a and packets output from ringlet selecting circuit 406 of node 105b), and packets received from ringlet-1 (packets output from forwarding circuit 402), and transmits the multiplexed packet to ringlet-1.

When a failure occurs on node 105a, multiplexing circuit 403 of node 105b multiplexes packets received from client apparatus 102 (packets output from Add selector SW 430 of node 105b), and packets received from ringlet-0 (packets output from forwarding circuit 401), and transmits the multiplexed packet to ringlet-0. When a failure occurs on node 105a, multiplexing circuit 404 of node 105b multiplexes packets received from client apparatus 102 (packets output from ringlet selecting circuit 406 of node 105b), and packets received from ringlet-1 (packets output from forwarding circuit 402), and transmits the multiplexed packet to ringlet-1.

Though redundancy node 111 has been described above as including the circuits such as forwarding circuits 401, 402, etc., redundancy node 111 may comprise a computer programmed to perform the same operation as those circuits.

If redundancy node 111 includes a computer, then it may have a packet transfer program for enabling the computer to carry out a packet distributing process for duplicating a packet received from a ringlet and distributing the received packet and the duplicate packet to the nodes included in the redundancy node, a failure detecting and indicating process for detecting the occurrence of a failure on each of the nodes included in the redundancy node and indicating the occurrence of the failure to the nodes, an output selecting process for, when in a normal state, selecting packets output from one of the nodes as packets to be sent to one of the ringlets and selecting packets output from the other node as packets to be set to the other ringlet, and when a failure occurs on one of the nodes included in the redundancy node, selecting packets output from the other node which is free of the failure as packets to be sent to the ringlet to which the node has sent packets, a filtering process for permitting the ringlet which transmits packets to transmits received packets to the client apparatus, and inhibiting the ringlet which does not transmit packets from transmitting received packets to the client apparatus, a multiplexing process for multiplexing packets to be transmitted to one of the ringlets which is selected as a ringlet to transmit packets and packets to be transmitted to one of the ringlets which is selected as a ringlet for the other node to transmit packets thereto, an output switching process for allowing its own node to perform the multiplexing process if packets generated based on packets received from the client apparatus are packets selected to be output from its own node to the ringlets in the output selecting process, allowing the other node to perform the multiplexing process if packets generated based on packets received from the client apparatus are packets selected to be output from the other node to the ringlet in the output selecting process, and allowing its own node to perform the multiplexing process if a failure occurs on the other node, and a client apparatus connecting process for connecting the redundancy node to a client apparatus when in a normal state, and disconnecting the redundancy node from the client apparatus when a failure occurs.

Figure 14:
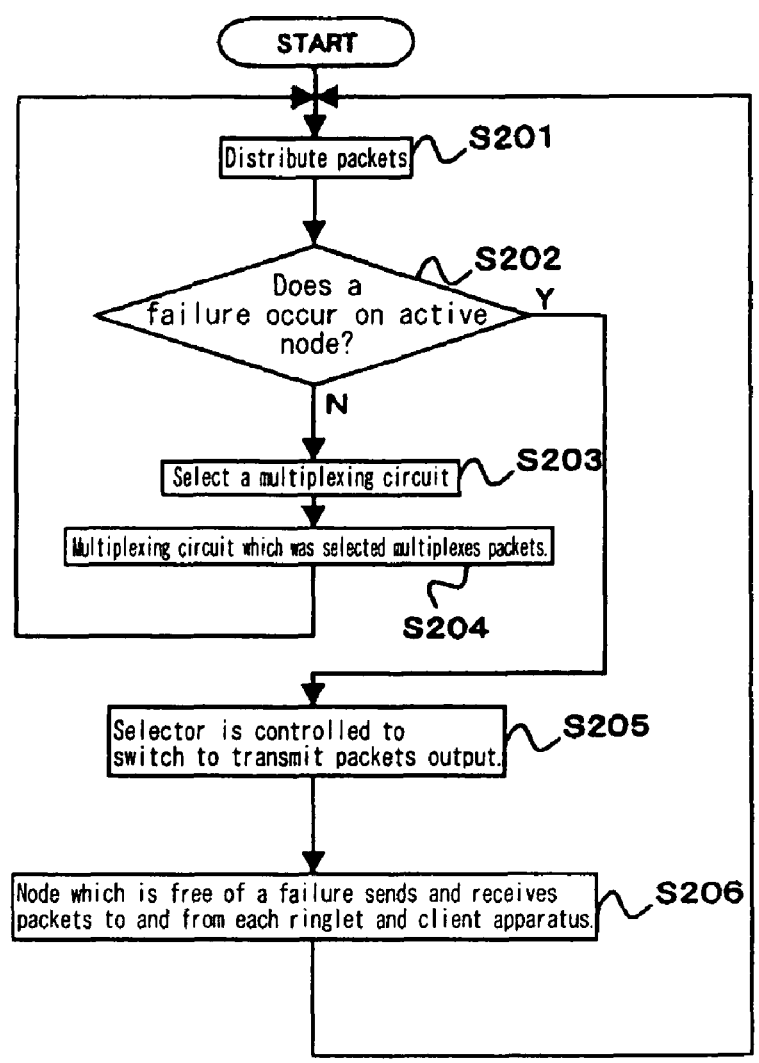
FIG. 14 is a flowchart of an operation sequence of the third exemplary embodiment of the present invention.

Operation of the third exemplary embodiment of the present invention will be described below with reference to the drawings. FIG. 14 is a flowchart of an operation sequence of the third exemplary embodiment of the present invention.

Irrespective of whether the nodes are normal or suffer a failure, distributors 103a, 103b supply (distribute) packets received from the ringlets by redundancy node 111 to both nodes 105a, 105b at all times (step S201). When in a normal state (N in step S202), packets received from the ringlets through ports 413-1, 414-2 by nodes 105a, 105b are processed in the same manner as with the first exemplary embodiment. According to the third exemplary embodiment, both nodes 105a, 105b operate as active nodes.

Node 105a adds and drops packets sent to and received from ringlet-0, and node 105b adds and drops packets sent to and received from ringlet-1. Packet converting circuit 411 converts packets received from client apparatus 102 through tributary port 412-1 into RPR packets.

Ringlet selecting circuit 406 selects a multiplexing circuit for multiplexing packets onto a ringlet (step S203). Specifically, ringlet selecting circuit 406 of node 105a selects multiplexing circuit 403 of its own node as a multiplexing circuit for multiplexing packets onto ringlet-0. Multiplexing circuit 403 multiplexes packets onto ringlet-0 (step S204).

Ringlet selecting circuit 406 of node 105a selects multiplexing circuit 404 of node 105b as a multiplexing circuit for multiplexing packets onto ringlet-1. Packets are now transferred through Add selector SW 430 to node 105b. Multiplexing circuit 404 of node 105b multiplexes the transferred packets onto ringlet-1 (step S204). When in a normal state, therefore, Add selector SW 430 of node 105a outputs packets input from ringlet selecting circuit 406 which are to be multiplexed onto ringlet-1, to the other node via Add/IF (Interface) 416-1 at all times.

Ringlet selecting circuit 406 of node 105b selects multiplexing circuit 404 of its own node as a multiplexing circuit for multiplexing packets onto ringlet-1. Multiplexing circuit 404 multiplexes packets onto ringlet-1 (step S204).

Ringlet selecting circuit 406 of node 105b selects multiplexing circuit 403 of node 105a as a multiplexing circuit for multiplexing packets onto ringlet-0. Packets are now transferred through Add selector SW 430 to node 105a. Multiplexing circuit 403 of node 105a multiplexes the transferred packets onto ringlet-0 (step S204). When in a normal state, therefore, Add selector SW 430 of node 105b outputs packets input from ringlet selecting circuit 406 which are to be multiplexed onto ringlet-0, to the other node via Add/IF (Interface) 416-4 at all times.

Selector 104a selects packets output from port 414-1 of node 105a as packets to be transmitted from redundancy node 111, and transmits the packets to ringlet-0. Selector 104b selects packets output from port 413-2 of node 105b as packets to be transmitted from redundancy node 111, and transmits the packets to ringlet-1.

Filter circuit 62 of node 105a outputs packets dropped from ringlet-0 to packet converting circuit 411, but does not output packets dropped from ringlet-1 to packet converting circuit 411. Filter circuit 62 of node 105b outputs packets dropped from ringlet-1 to packet converting circuit 411, but does not output packets dropped from ringlet-0 to packet converting circuit 411.

This operation of filter circuit 62 is realized by referring to a Ringlet ID field (a field for storing the ringlet number of a ringlet from which packets are dropped) stored in an RPR packet header according to IEEE 802.17. Because of the operation of filter circuit 62, address table 412 can learn the address information of RPR packets dropped from both ringlet-0 and ringlet-1 for preventing packets from being redundantly transferred to client apparatus 102.

If node failure detecting and indicating circuit 106 detects a failure of node 105a (Y in step S202), selector 104a is controlled to switch to transmit packets output from node 105b (step S205). Selector 104a now selects packets output from node 105b which is free of a failure as packets to be transmitted from redundancy node 111, and transmits the packets to each ringlet (step S206).

The active node is selectively connected to client apparatus 102 in each flow by a distributed protocol such as link aggregation. If a failure occurs on node 105a, then tributary port 412-2 of node 105a blocks an optical output signal, causing client apparatus 102 to send and receive packets to and from backup node 105b autonomously. Thus, node 105b which is free of a failure sends and receives packets to and from client apparatus 102 (step S206). Only node 105b communicates with client apparatus 102, and Add selector switch SW of node 105b selects multiplexing circuit 43 of its own node as a multiplexing circuit for multiplexing packets onto ringlet-0. Multiplexing circuit 403 then multiplexes packets onto ringlet-0.

Advantages of the third exemplary embodiment will be described below. Both nodes 105a, 105b serve as active nodes, and each of the nodes operates to add and drop packets for each ringlet, so that a distributed algorithm for selecting a port for each flow is applied to the connection to client apparatus 102 for communication therewith. When in a normal state, therefore, the tributary ports of both nodes can be used for communication with client apparatus 102, and hence the efficiency with which to use resources is increased.

Node 105a may include an Add selector switch for outputting packets output from ringlet selecting circuit 406 to multiplexing circuit 403 of its own node or multiplexing circuit 403 of node 105b, and node 105b may include an Add selector switch for outputting packets output from ringlet selecting circuit 406 to multiplexing circuit 404 of its own node or multiplexing circuit 404 of node 105a.

Such a structure allows node 105a and node 105b to be identical in configuration to each other, and hence is effective to reduce the production cost of redundancy node 111.

4th Exemplary Embodiment

Figure 15:
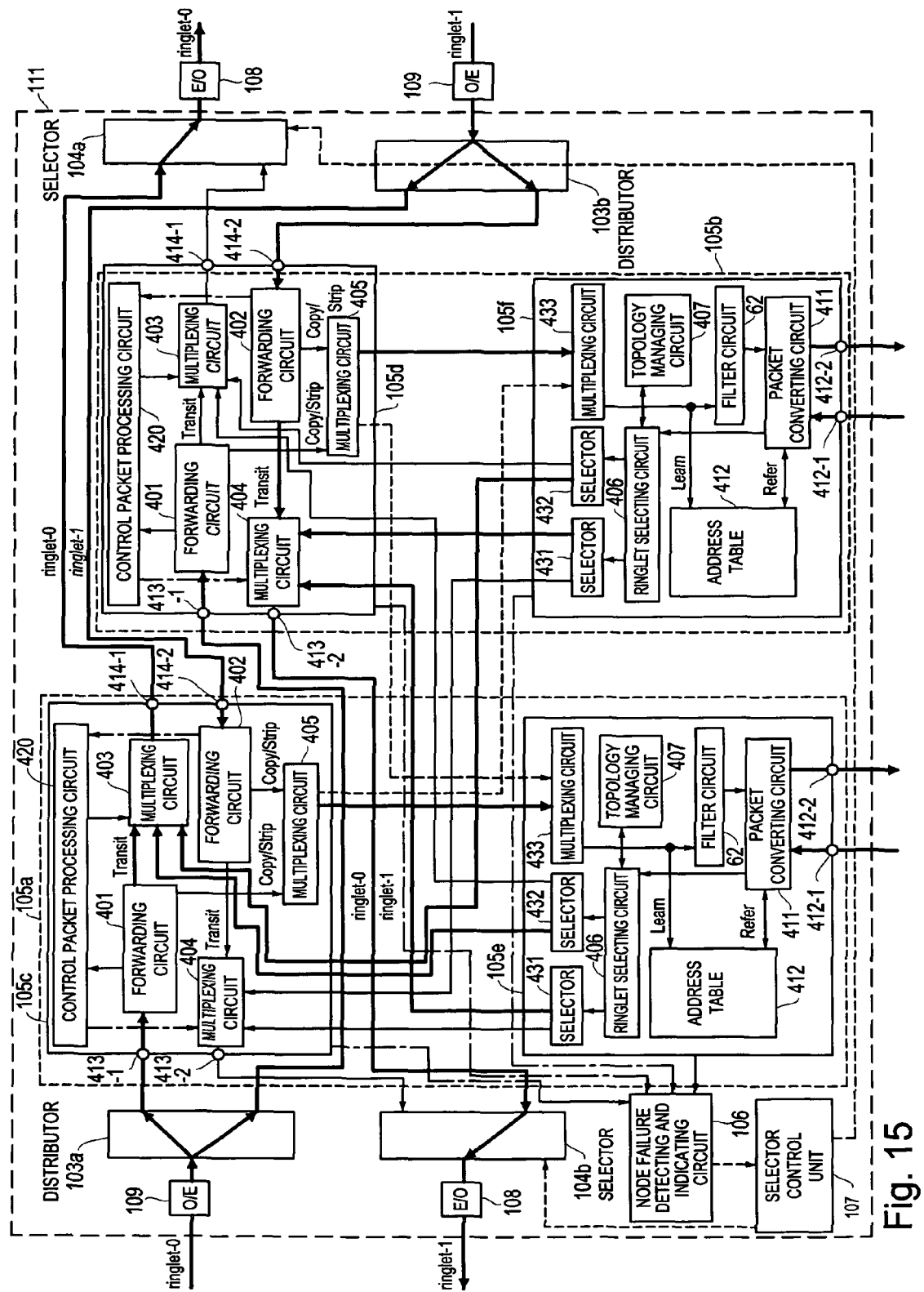
FIG. 15 is a block diagram showing a configurational example of a redundancy node according to a fourth exemplary embodiment of the present invention.

A fourth exemplary embodiment of the present invention will be described below with reference to the drawings. FIG. 15 is a diagram showing a configurational example of a packet ring network system according to a fourth exemplary embodiment of the present invention.

According to the fourth exemplary embodiment, node 105a illustrated in the first exemplary embodiment (FIG. 8) is divided into RPR packet transfer unit 105c and RPR packet processor 105e, and node 105b is divided into RPR packet transfer unit 105d and RPR packet processor 105f.

RPR packet processors 105e, 105f include selectors (transfer unit selecting means) 431, 432 for selecting suitable multiplexing circuits 403, 404 depending on the failure statuses of RPR packet transfer units 105c, 105d and RPR packet processors 105e, 105f when in a normal state and when a failure occurs on the nodes. Since other configurational details of the fourth exemplary embodiment are identical to those of the first exemplary embodiment, they are denoted by identical reference characters and will not be described below.

Multiplexing circuit 405 duplicates packets output from forwarding circuits 401, 402, and transfers (distributes) the packets to multiplexing circuits 433 of RPR packet processors 105e, 105f. Multiplexing circuits 433 of RPR packet processors 105e, 105f multiplex packets transferred by multiplexing circuits 405 of RPR packet transfer units 105c, 105d, and output the multiplexed packets to filter circuits 62.

It is necessary to make filter settings in filter circuit 62. Specifically, when in a normal state, filter circuit 62 of RPR packet processor 105e (node 105a) outputs packets dropped from ringlet-0 to packet converting circuit 411, but does not output packets dropped from ringlet-1 to packet converting circuit 411.

When in a normal state, filter circuit 62 of RPR packet processor 105f (node 105b) outputs packets dropped from ringlet-1 to packet converting circuit 411, but does not output packets dropped from ringlet-0 to packet converting circuit 411.

This operation of filter circuit 62 is realized by referring to a Ringlet ID field (a field for storing the ringlet number of a ringlet from which packets are dropped) stored in an RPR packet header according to IEEE 802.17. Because of the operation of filter circuit 62, address table 412 can learn the address information of RPR packets dropped from both ringlet-0 and ringlet-1 for preventing packets from being redundantly transferred to client apparatus 102.

Though redundancy node 111 has been described above as including the circuits such as forwarding circuits 401, 402, etc., redundancy node 111 may comprise a computer programmed to perform the same operation as those circuits.

If redundancy node 111 includes a computer, then it may have a packet transfer program for enabling the computer to carry out a process for transferring packets from one of the packet transfer units to one of the ringlets and transferring packets from the other packet transfer unit to the other ringlet, a process for duplicating packets received from a ringlet and distributing the received packets and the duplicate packets to the packet transfer units included in the redundancy node, a process for detecting the occurrence of a failure on each of the packet transfer units and the packet processors included in the redundancy node and indicating the occurrence of the failure to the packet transfer units and the packet processors, a process for, when in a normal state, selecting packets output from one of the packet transfer units as packets to be sent to one of the ringlets and selecting packets output from the other packet transfer unit as packets to be set to the other ringlet, and when a failure occurs on one of the packet transfer units included in the redundancy node, selecting packets output from the other packet transfer unit which is free of the failure as packets to be sent to the ringlet to which the packet transfer unit has sent packets, a process for outputting packets received from the client apparatus to the packet transfer units and transmitting packets received from the ringlets by the packet transfer units to the client apparatus, a process for multiplexing packets received from the two packet transfer units, a process for permitting or inhibiting the transmission of packets received from the ringlets to the client apparatus depending on whether there is a failure or not, a process for connecting the redundancy node to the client apparatus through a link when in a normal state and disconnecting the redundancy node from the client apparatus when a failure occurs, and a process for, when a failure occurs on one of the packet transfer units, outputting packets received from the client apparatus to the other packet transfer unit.

Figure 16:
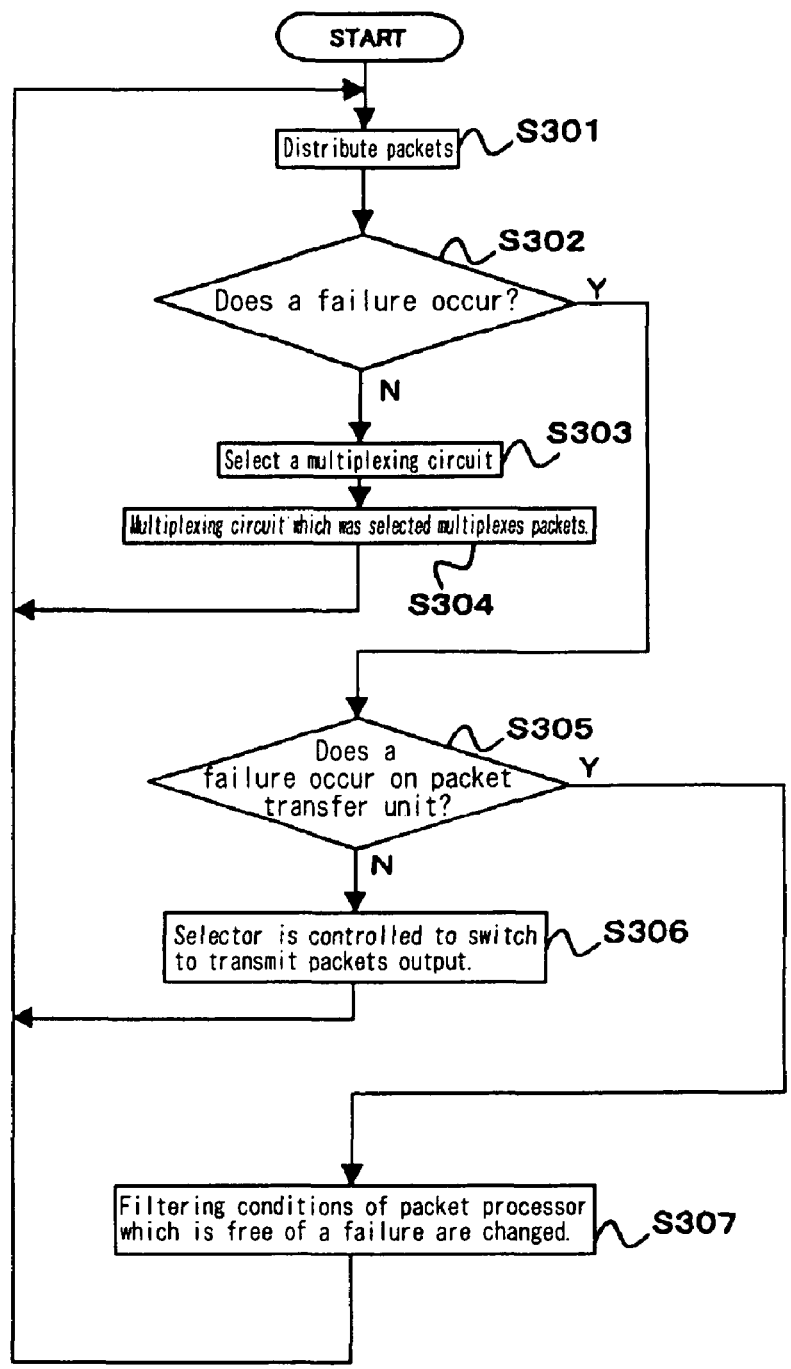
FIG. 16 is a flowchart of an operation sequence of the fourth exemplary embodiment of the present invention.

Operation of the fourth exemplary embodiment of the present invention will be described below with reference to the drawings. FIG. 16 is a flowchart of an operation sequence of the fourth exemplary embodiment of the present invention.

Irrespective of whether the nodes are normal or suffer a failure, distributors 103a, 103b supply (distribute) packets received from the ringlets by redundancy node 111 to node 105a (RPR packet transfer unit 105c) and node 105b (RPR packet transfer unit 105d) at all times (step S301).

When in a normal state (N in step S302), selectors 431, 432 of the respective RPR packet processors select a destination to which packets are to be output such that multiplexing circuit 403 of RPR packet transfer unit 105c of node 105a will multiplex packets onto ringlet-0 in redundancy node 111 (step S303). Multiplexing circuit 403 then multiplexes packets onto ringlet-0 in redundancy node 111 (step S304).

Selectors 431, 432 of the respective RPR packet processors select a destination to which packets are to be output such that multiplexing circuit 404 of RPR packet transfer unit 105d of node 105b will multiplex packets onto ringlet-1 (step S303). Multiplexing circuit 404 then multiplexes packets onto ringlet-1 in redundancy node 111 (step S304).

Operation of the redundancy node at the time a failure occurs on an RPR packet transfer unit will be described below. For example, operation at the time a failure occurs on RPR packet transfer unit 105c of node 105a will be described below.

If node failure detecting and indicating circuit 106 detects a failure of RPR packet transfer unit 105c (Y in step S302, Y in step S305), then node failure detecting and indicating circuit 106 outputs failure information to RPR packet transfer unit 105d, RPR packet processors 105e, 105f, and selector control circuit 107.

When selector control circuit 107 receives the failure information indicating that a failure has occurred on RPR packet transfer unit 105c of node 105a, selector control circuit 107 controls selector 104a to switch to select packets output from port 414-1 of node 105b as packets to be transmitted from redundancy node 111 (step S306).

Since multiplexing circuit 404 of RPR packet transfer unit 105c of node 105a is unable to multiplex packets onto ringlet-0 due to the occurrence of the failure, selector 432 changes packet output destinations and multiplexing circuits 403, 404 of RPR packet transfer unit 105d of node 105b multiplex packets. As node 105b needs to drop packets received from both the ringlets, filtering conditions of filter circuit 62 of RPR packet processor 105e are changed to transfer packets unconditionally to the tributary port.

Operation of the redundancy node at the time a failure occurs on a RPR packet processor, e.g., RPR packet processor 105e of node 105a, will be described below.

If node failure detecting and indicating circuit 106 detects a failure of RPR packet processor 105e (Y in step S302, N in step S305), then node failure detecting and indicating circuit 106 outputs failure information to RPR packet transfer units 105c, 105d, RPR packet processor 105f, and selector control circuit 107.

If a failure occurs on RPR packet processor 105e of node 105a, then since it is impossible for RPR packet processor 105e of node 105a and client apparatus 102 to communicate with each other, client apparatus 102 is connected to only RPR packet processor 105*f* of node 105*b* which is capable of communicating therewith (to send and receive packets).

Multiplexing circuit 433 of RPR packet processor 105*f* multiplexes packets transferred from both multiplexing circuits 405 of RPR packet transfer units 105*c*, 105*d*, and transfer the multiplexed packet to the tributary port (client apparatus 102). As node 105*b* needs to drop packets received from both the ringlets, filtering conditions of filter circuit 62 of RPR packet processor 105*f* are changed to transfer packets unconditionally to the tributary port (step S307).

Advantages of the present exemplary embodiment will be described below. Inasmuch as each of nodes 105*a*, 105*b* is divided into an RPR packet transfer unit and an RPR packet processor and has a redundant configuration, multiplexing circuits 403, 404 can have a plurality of input ports with respect to two RPR packet transfer units 105*c*, 105*d*, and three or more RPR packet processors can be provided.

Thus, a card menu (e.g., a card-type electronic circuit) wherein the processing capability of RPR packet processors and the band of tributary ports are optimized may be prepared, allowing services to start with a minimum amount of equipment required and also allowing the tributary band to be increased or reduced depending on a change in the band. In this manner, the number of RPR packet processors provided can be increased or reduced when necessary, thereby reducing the cost of equipment.

Figure 17:
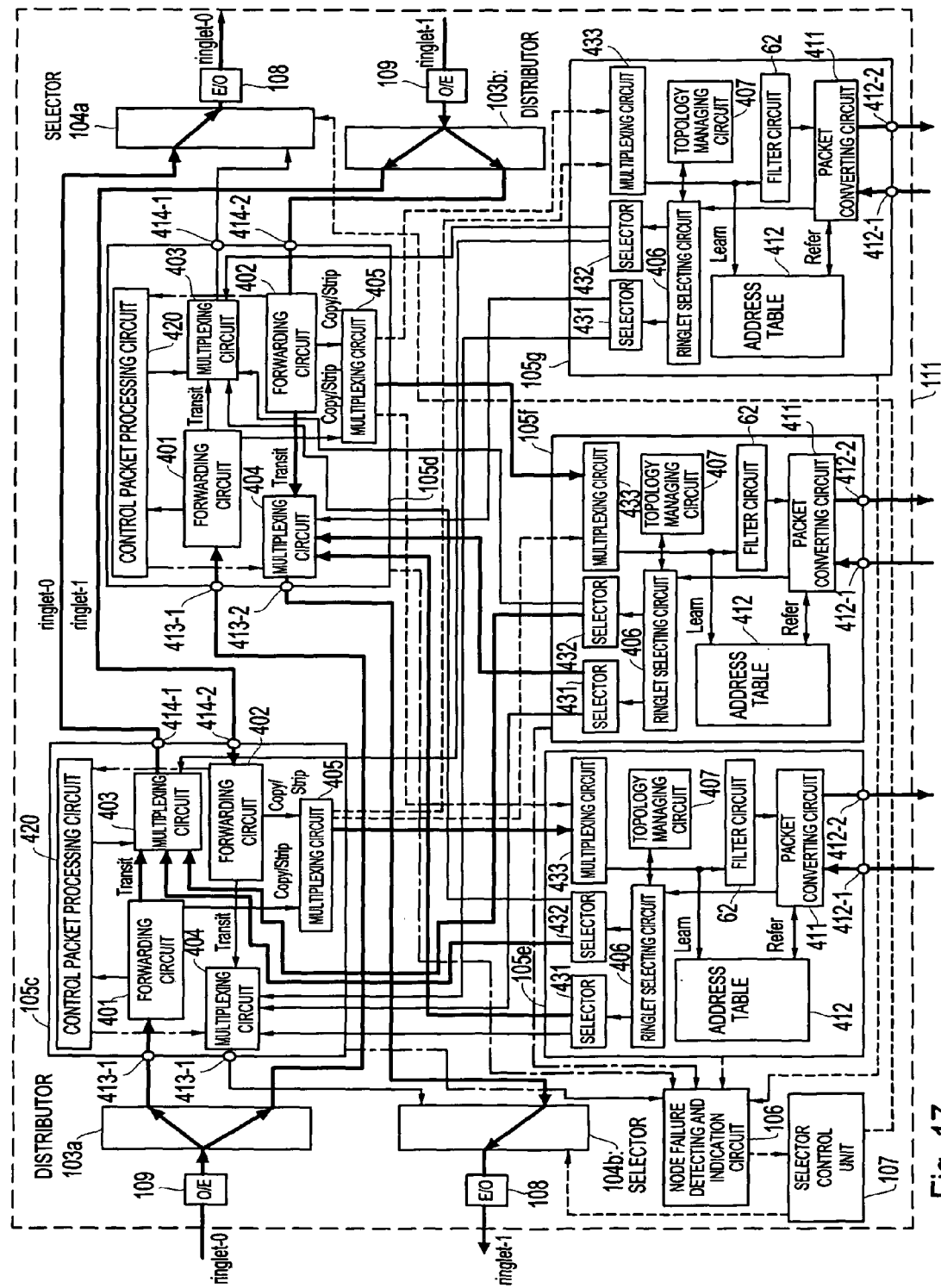
FIG. 17 is a block diagram showing a configurational example of a redundancy node including three RPR packet processors.

Redundancy node 111 may have three or more RPR packet processors whereas it has two RPR packet transfer units. FIG. 17 is a block diagram showing a configurational example of a redundancy node including three RPR packet processors.

According to the third exemplary embodiment, in the event of a failure on either one of nodes 105*a*, 105*b*, the capacity of the connection to client apparatus 102 is reduced to one-half. However, if an RPR packet processor is added, providing three RPR packet processors, and when in a normal state, any two of the tributary ports of the three RPR packet processors are fixedly assigned as ports according to a distributed algorithm, then a protective configuration may be employed for preventing a reduction in the band of client apparatus 102 for sending packets to and receiving packets from the ringlets in the event of a failure on any functional blocks (RPR packet transfer unit 105*c* or 105*d* or either one of RPR packet processors 105*e*, 105*f*, 105*g*).

The invention claimed is:

1. A packet ring network system including nodes for sending and receiving packets, which are connected respectively to two ringlets for transferring packets therethrough in mutually opposite directions, comprising:
   a redundancy node including two nodes having the same address; and
   a client apparatus connected to the two nodes included in said redundancy node;
   wherein said redundancy node further comprises:
      packet distributing means for duplicating packets received from the ringlets and distributing the received packets and the duplicate packets to the nodes included in the redundancy node;
      failure detecting and indicating means for detecting an occurrence of a failure on each of the nodes included in the redundancy node and indicating the occurrence of the failure to each of the nodes; and
      output selecting means for, when a failure occurs on one of the nodes, selecting a packet output from the other node as a packet to be output from said redundancy node, and when in a normal state, selecting a packet output from one of the nodes as a packet to be output from the redundancy node;
   wherein each of the nodes included in said redundancy node comprises:
      client apparatus connecting means for connecting the redundancy node to said client apparatus by a link when in a normal state, and disconnecting the redundancy node from the client apparatus when a failure occurs, and
   wherein the redundancy node is connected with the ringlets through the packet distributing means and the output selecting means.

2. The packet ring network system according to claim 1, wherein each of the nodes included in said redundancy node includes filtering means for permitting or inhibiting a transmission of packets received from the ringlets to the client apparatus depending on whether or not there is a failure on an active node as one of the nodes; and
   wherein when in a normal state, said output selecting means selects packets output from said active node as packets to be sent from said redundancy node, and when a failure occurs on said active node, said output selecting means selects packets output from a backup node, as the other node, as packets to be sent from said redundancy node.

3. A packet ring network system including nodes for sending and receiving packets, which are connected respectively to two ringlets for transferring packets therethrough in mutually opposite directions, comprising:
   a redundancy node including two nodes having the same address; and
   a client apparatus connected to the two nodes included in said redundancy node;
   wherein one of the nodes included in said redundancy node sends packets to one of the ringlets as being output from said redundancy node, and the other node included in said redundancy node sends packets to the other ringlet as being output from said redundancy node;
   wherein said redundancy node further comprises:
      packet distributing means for duplicating packets received from the ringlets and distributing the received packets and the duplicate packets to the nodes included in the redundancy node;
      failure detecting and indicating means for detecting an occurrence of a failure on each of the nodes included in the redundancy node and indicating the occurrence of the failure to each of the nodes; and
      output selecting means for, when in a normal state, selecting packets output from one of the nodes as packets to be sent to one of the ringlets and selecting packets output from the other node as packets to be sent to the other ringlet, and when a failure occurs on one of the nodes included in the redundancy node, selecting packets output from the other node which is free of the failure as packets to be sent to the ringlet to which the node has sent packets;
   wherein each of the nodes included in said redundancy node comprises:
      filtering means for permitting the ringlet, which transmits packets, to transmit received packets to said client apparatus, and inhibiting the ringlet which does not transmit packets from transmitting received packets to said client apparatus;
      ringlet selecting means for selecting a ringlet for sending packets therethrough;
      multiplexing means for multiplexing packets to be transmitted to one of the ringlets, which is selected by said ringlet selecting means, and packets to be transmitted to said one of the ringlets, which is selected by said ringlet selecting means, disposed in the other node;

output switching means for outputting packets to the multiplexing means of its own node if packets generated based on packets received from said client apparatus are packets selected to be output from its own node to the ringlets by said output selecting means, outputting packets to the multiplexing means of the other node if packets generated based on packets received from said client apparatus are packets selected to be output from the other node to the ringlet by said output selecting means, and outputting packets to the multiplexing means of its own node if a failure occurs on the other node; and client apparatus connecting means for connecting the redundancy node to said client apparatus through a link when in a normal state, and disconnecting the redundancy node from said client apparatus when a failure occurs, wherein the redundancy node is connected with the ringlets through the packet distributing means and the output selecting means.

4. The packet ring network system according to claim 3, wherein when a failure occurs on one of links between the client apparatus and the two nodes included in said redundancy node, said client apparatus sends packets to the node connected thereto by the link which is free of the failure; and when a failure occurs on the link between the other node and said client apparatus, said filtering means permits packets received from any one of said ringlets to be sent to said client apparatus.

5. A packet ring network system including nodes for sending and receiving packets, which are connected respectively to two ringlets for transferring packets therethrough in mutually opposite directions, comprising:

a redundancy node including two packet transfer units having the same address, for sending packets to the ringlets and receiving packets from the ringlets, and a plurality of packet processors for outputting packets received from a client apparatus to said packet transfer units and sending packets received from the ringlets by said packet transfer units to said client apparatus, wherein one of said packet transfer units sends packets to one of said ringlets and the other packet transfer unit sends packets to the other ringlet, and said client apparatus is connected to said packet processors included in said redundancy node by a link;

wherein said redundancy node further comprises:

packet distributing means for duplicating packets received from the ringlets and distributing the received packets and the duplicate packets to the packet transfer units included in said redundancy node;

failure detecting and indicating means for detecting an occurrence of a failure on each of the packet transfer units and the packet processors included in said redundancy node and indicating the occurrence of the failure to each of the packet transfer units and the packet processors; and output selecting means for, when in a normal state, selecting packets output from one of the packet transfer units as packets to be sent to one of the ringlets and selecting packets output from the other packet transfer unit as packets to be sent to the other ringlet, and when a failure occurs on one of the packet transfer units included in the redundancy node, selecting packets output from the other packet transfer unit which is free of the failure as packets to be sent to the ringlet to which the packet transfer unit has sent packets; and wherein each of said packet processors comprises:

transfer unit selecting means for, when a failure occurs on one of the packet transfer units, outputting packets received from said client apparatus to the other packet transfer unit;

multiplexing means for multiplexing packets received from the two packet transfer units;

filtering means for permitting or inhibiting a transmission of packets received from the ringlets to said client apparatus depending on whether there is a failure or not; and client apparatus connecting means for connecting the redundancy node to said client apparatus through the link when in a normal state and disconnecting the redundancy node from said client apparatus when a failure occurs, wherein the redundancy node is connected with the ringlets through the packet distributing means and the output selecting means.

6. The packet ring network system according to claim 5, wherein the packet transfer units duplicate packets to be output to the packet processors so as to be able to distribute the packets to all the packet processors included in the redundancy node, and distribute the duplicated packets to all the packet processors; and when in a normal state, only the filtering means included in one of the packet processors permits packets received from one of the ringlets to be sent to said client apparatus, and only the filtering means included in another one of the packet processors permits packets received from the other ringlet to be sent to said client apparatus, and when a failure occurs on the packet processor including the filtering means which permits the packets received from said one or other ringlet to be sent to said client apparatus, only the filtering means included in still another one of the packet processors permits packets received from said one or other ringlet to be sent to said client apparatus.

7. A packet transfer method of transferring packets in a packet ring network system including two ringlets for transferring packets therethrough in mutually opposite direction nodes for sending and receiving packets, a redundancy node connected to said ringlets and including two nodes having the same address, and a client apparatus connected to the nodes included in said redundancy node, said method comprising:

by said redundancy node:

duplicating packets received from the ringlets and distributing the received packets and the duplicate packets to the nodes included in the redundancy node;

when in a normal state, selecting packets output from one of the nodes as packets to be output from said redundancy node;

when in a normal state, connecting the redundancy node to said client apparatus through a link;

when an occurrence of a failure on each of the nodes included in said redundancy node is detected, indicating the occurrence of the failure to each of the nodes;

when a failure occurs on one of the nodes selecting packets output from the other nodes as packets to be sent from said redundancy node; and when a failure occurs, disconnecting the redundancy node from the client apparatus, wherein the redundancy node further includes packet distributing means for performing the distributing of the received packets and output selecting means for performing the selecting of the packets output from one of the nodes, and is connected with the ringlets through the packet distributing means and the output selecting means.

8. The packet transfer method according to claim 7, wherein each of the nodes included in said redundancy node permits or inhibits a transmission of packets received from the ringlets to the client apparatus depending on whether or not there is a failure on an active node as one of the nodes; and when in a normal state, each of the nodes selects packets output from said active node as packets to be sent from said redundancy. node, and when a failure occurs on said active node, each of the nodes selects packets output from a backup node, as the other node, as packets to be sent from said redundancy node.

9. A packet transfer method of transferring packets in a packet ring network system including two ringlets for transferring packets therethrough in mutually opposite directions; nodes for sending and receiving packets, a redundancy node connected to said ringlets and including two nodes having the same address, and a client apparatus connected to the nodes included in said redundancy node, the method comprising:

by one of the nodes included in said redundancy node, sending packets to one of the ringlets as being output from said redundancy node;

by the other node included in said redundancy node, sending packets to the other ringlet as being output from said redundancy node;

by said redundancy node:

duplicating packets received from the ringlets and distributing the received packets and the duplicate packets to the nodes included in the redundancy node;

when in a normal state, selecting packets output from one of the nodes as packets to be sent to one of the ringlets and selecting packets output from the other node as packets to be sent to the other ringlet;

detecting an occurrence of a failure on each of the nodes included in said redundancy node, and indicating the occurrence of the failure to each of the nodes; and when a failure occurs on one of the nodes included in the redundancy node, selecting packets output from the other node which is free of the failure as packets to be sent to the ringlet to which the node has sent packets; and by each of the nodes included in said redundancy node:

multiplexing packets to be transmitted to one of the ringlets which is selected as a ringlet for transmitting packets therethrough and packets to be transmitted to said one of the ringlets which is selected by the other node;

permitting the ringlet which transmits packets to transmit received packets to said client apparatus, and inhibiting the ringlet which does not transmit packets from transmitting received packets to said client apparatus;

connecting the redundancy node to said client apparatus through a link when in a normal state, and disconnecting the redundancy node from said client apparatus when a failure occurs;

multiplexing packets on its own node if packets generated based on packets received from said client apparatus are packets selected to be output from its own node to the ringlets, and multiplexing packets on the other node if packets generated based on packets received from said client apparatus are packets selected to be output from the other node to the ringlet; and multiplexing packets on its own node if a failure occurs on the other node, wherein the redundancy node further includes packet distributing means for performing the distributing of the received packets and output selecting means for performing the selecting of the packets output from one of the nodes, and is connected with the ringlets through the packet distributing means and the output selecting means.

10. The packet transfer method according to claim 9, wherein when a failure occurs on one of links between the client apparatus and the two nodes included in said redundancy node, said client apparatus sends packets to the node connected thereto by the link which is free of the failure; and when a failure occurs on the link between the other node and said client apparatus, each of the nodes permits packets received from any one of said ringlets to be sent to said client apparatus.

11. A packet transfer method of transferring packets in a packet ring network system including two ringlets for transferring packets therethrough in mutually opposite directions, a redundancy node comprising two packet transfer units having the same address, for sending packets to the ringlets and receiving packets from the ringlets, and a plurality of packet processors for sending packets to and receiving packets from a client apparatus, and the client apparatus connected to said packet processors included in said redundancy node by a link, the method comprising:

by one of said packet transfer units, sending packets to one of said ringlets;

by the other packet transfer unit, sending packets to the other ringlets;

by said redundancy node:

duplicating packets received from the ringlets and distributing the received packets and the duplicate packets to the packet transfer units included in said redundancy node;

when in a normal state, selecting packets output from one of the packet transfer units as packets to be sent to one of the ringlets and selecting packets output from the other packet transfer unit as packets to be sent to the other ringlet;

detecting an occurrence of a failure on each of the packet transfer units and the packet processors included in said redundancy node, and indicating the occurrence of the failure to each of the packet transfer units and the packet processors;

when a failure occurs on either one of the packet transfer units included in the redundancy node, selecting packets output from the other packet transfer unit which is free of the failure as packets to be sent to the ringlet to which the packet transfer unit has sent packets;

by each of said packet processors:

connecting the redundancy node to said client apparatus through the link when in a normal state;

multiplexing packets received from the two packet transfer units;

outputting packets received from said client apparatus to said packet transfer units, and sending packets received from the ringlets by said packet transfer units to said client apparatus;

permitting or inhibiting a transmission of packets received from the ringlets to said client apparatus depending on whether there is a failure or not;

disconnecting the redundancy node from said client apparatus when a failure occurs; and when a failure occurs on one of the packet transfer units, outputting packets received from said client apparatus to the other packet transfer unit; and by said client apparatus:

sending and receiving packets to and from said packet processor depending on the ringlet through which packets are sent and received, wherein the redundancy node further includes packet distributing means for performing the distributing of the received packets and output selecting means for performing the selecting of the packets output from one of the packet transfer units, and is connected with the ringlets through the packet distributing means and the output selecting means.

12. The packet transfer method according to claim 11, wherein the packet transfer units duplicate packets to be output to the packet processors so as to be able to distribute the packets to all the packet processors included in the redundancy node, and distribute the duplicated packets to all the packet processors; and when in a normal state, only one of the packet processors permits packets received from one of the ringlets to be sent to said client apparatus, and only another one of the packet processor permits packets received from the other ringlet to be sent to said client apparatus, and when a failure occurs on the packet processor which permits the packets received from said one or other ringlet to be sent to said client apparatus, only still another one of the packet processors permits packets received from said one or other ringlet to be sent to said client apparatus.

13. A redundancy node connected to two ringlets for transferring packets therethrough in mutually opposite directions and a client apparatus for sending and receiving packets, said redundancy node including two nodes having the same address for sending and receiving packets. said redundancy node comprising:

packet distributing means for duplicating packets received from the ringlets and distributing the received packets and the duplicate packets to the nodes included in the redundancy node;

failure detecting and indicating means for detecting an occurrence of a failure on each of the nodes included in the redundancy node and indicating the occurrence of the failure to each of the nodes; and output selecting means for, when a failure occurs on one of the nodes, selecting a packet output from the other node as a packet to be sent from said redundancy node, and when in a normal state, selecting a packet output from one of the nodes as a packet to be sent from the redundancy node;

wherein each of the nodes included in said redundancy node comprises:

client apparatus connecting means for connecting the redundancy node to said client apparatus when in a normal state, and disconnecting the redundancy node from the client apparatus when a failure occurs; and wherein the redundancy node is connected with the ringlets through the packet distributing means and the output selecting means.

14. The redundancy node according to claim 13, wherein each of the nodes included in said redundancy node includes filtering means for permitting or inhibiting a transmission of packets received from the ringlets to the client apparatus depending on whether or not there is a failure on an active node as one of the nodes; and wherein when in a normal state, said output selecting means selects packets output from said active node as packets to be sent from said redundancy node, and when a failure occurs on said active node, said output selecting means selects packets output from a backup node, as the other node, as packets to be sent from said redundancy node.

15. A redundancy node connected to two ringlets for transferring packets therethrough in mutually opposite directions and a client apparatus for sending and receiving packets, said redundancy node comprising:

two nodes having the same address for sending and receiving packets, wherein one of the nodes included in said redundancy node sends packets to one of the ringlets as being output from said redundancy node. and the other node included in said redundancy node sends packets to the other ringlet as being output from said redundancy node;

wherein said redundancy node further comprises:

packet distributing means for duplicating packets received from the ringlets and distributing the received packets and the duplicate packets to the nodes included in the redundancy node;

failure detecting and indicating means for detecting an occurrence of a failure on each of the nodes included in the redundancy node and indicating the occurrence of the failure to each of the nodes; and output selecting means for, when in a normal state, selecting packets output from one of the nodes as packets to be sent to one of the ringlets and selecting packets output from the other node as packets to be sent to the other ringlet, and when a failure occurs on one of the nodes included in the redundancy node, selecting packets output from the other node which is free of the failure as packets to be sent to the ringlet to which the node has sent packets;

wherein each of the nodes included in said redundancy node comprises:

filtering means for permitting the ringlet which transmits packets to transmit received packets to said client apparatus, and inhibiting the ringlet which does not transmit packets from transmitting received packets to said client apparatus;

ringlet selecting means for selecting a ringlet for sending packets therethrough;

multiplexing means for multiplexing packets to be transmitted to one of the ringlets which is selected by said ringlet selecting means and packets to be transmitted to said one of the ringlets which is selected by said ringlet selecting means disposed in the other node;

output switching means for outputting packets to the multiplexing means of its own node if packets generated based on packets received from said client apparatus are packets selected to be output from its own node to the ringlets by said output selecting means, outputting packets to the multiplexing means of the other node if packets generated based on packets received from said client apparatus are packets selected to be output from the other node to the ringlet by said output selecting means, and outputting packets to the multiplexing means of its own node if a failure occurs on the other node; and client apparatus connecting means for connecting the redundancy node to said client apparatus through a link when in a normal state, and disconnecting the redundancy node from said client apparatus when a failure occurs, and wherein the redundancy node is connected with the ringlets through the packet distributing means and the output selecting means.

16. The redundancy node according to claim 15, wherein when a failure occurs on the link between the other node and said client apparatus, said filtering means permits packets received from any one of said ringlets to be sent to said client apparatus.

17. A redundancy node connected to two ringlets for transferring packets therethrough in mutually opposite directions and a client apparatus for sending and receiving packets for sending and receiving packets to and from, nodes connected to said ringlets and said client apparatus, comprising:

two packet transfer units having the same address, for sending packets to the ringlets and receiving packets from the ringlets;

a plurality of packet processors for outputting packets received from a client apparatus to said packet transfer units and sending packets received from the ringlets by said packet transfer units to said client apparatus;

packet distributing means for duplicating packets received from the ringlets and distributing the received packets and the duplicate packets to the packet transfer units included in said redundancy node;

failure detecting and indicating means for detecting the occurrence of a failure on each of the packet transfer units and the packet processors included in said redundancy node and indicating the occurrence of the failure to each of the packet transfer units and the packet processors; and output selecting means for, when in a normal state, selecting packets output from one of the packet transfer units as packets to be sent to one of the ringlets and selecting packets output from the other packet transfer unit as packets to be sent to the other ringlet, and when a failure occurs on one of the packet transfer units included in the redundancy node, selecting packets output from the other packet transfer unit which is free of the failure as packets to be sent to the ringlet to which the packet transfer unit has sent packets;

wherein each of said packet processors comprises:

multiplexing means for multiplexing packets received from the two packet transfer units;

transfer unit selecting means for, when a failure occurs on one of the packet transfer units, outputting packets received from said client apparatus to the other packet transfer unit;

filtering means for permitting or inhibiting a transmission of packets received from the ringlets to said client apparatus depending on whether there is a failure or not; and client apparatus connecting means for connecting the redundancy node to said client apparatus through the link when in a normal state and disconnecting the redundancy node from said client apparatus when a failure occurs;

wherein one of said packet transfer units sends packets to one of the ringlets; and the other packet transfer unit sends packets to the other ringlet, and wherein the redundancy node is connected with the ringlets through the packet distributing means and the output selecting means.

18. The redundancy node to claim 17, wherein the packet transfer units duplicate packets to be output to the packet processors so as to be able to distribute the packets to all the packet processors included in the redundancy node, and distribute the duplicated packets to all the packet processors; and when in a normal state, only the filtering means included in one of the packet processors permits packets received from one of the ringlets to be sent to said client apparatus, and only the filtering means included in another one of the packet processors permits packets received from the other ringlet to be sent to said client apparatus, and when a failure occurs on the packet processor including the filtering means which permits the packets received from said one or other ringlet to be sent to said client apparatus, only the filtering means included in still another one of the packet processors permits packets received from said one or other ringlet to be sent to said client apparatus.

19. A non-transitory computer readable medium storing a packet transfer program incorporated in a redundancy node connected to two ringlets for transferring packets therethrough in mutually opposite directions and a client apparatus for sending and receiving packets, said redundancy node including two nodes having the same address for sending and receiving packets, wherein said packet transfer program is executable by a computer to perform a packet transfer method, the method comprising;

a packet distributing process for duplicating packets received from the ringlets and distributing the received packets and the duplicate packets to the nodes included in the redundancy node;

a failure detecting and indicating process for detecting an occurrence of a failure on each of the nodes included in the redundancy node and indicating the occurrence of the failure to each of the nodes;

an output selecting process for, when failure occurs on one of the nodes, selecting a packet output from the other node as a packet to be output from said redundancy node, and when in a normal state, selecting a packet output from one of the nodes as a packet to output from the redundancy node; and a client apparatus connecting process for connecting the redundancy node to said client apparatus when in a normal state, and disconnecting the redundancy node from the client apparatus when a failure occurs, wherein the redundancy node further includes packet distributing means for performing the distributing of the received packets and output selecting means for performing the selecting of the packets output from the other node, and is connected with the ringlets through the packet distributing means and the output selecting means.

20. A non-transitory computer readable medium storing a packet transfer program incorporated in a redundancy node connected to two ringlets for transferring packets therethrough in mutually opposite directions and a client apparatus for sending and receiving packets, said redundancy node including two nodes having the same address for sending and receiving packets, wherein said packet transfer program is executable by a computer to perform a packet transfer method, the method comprising;

a packet distributing process for duplicating packets received from the ringlets and distributing the received packets and the duplicate packets to the nodes included in the redundancy node;

a failure detecting and indicating process for detecting an occurrence of a failure on each of the nodes included in the redundancy node and indicating the occurrence of the failure to each of the nodes;

an output selecting process for, when in a normal state, selecting packets output from one of the nodes as packets to be sent to one of the ringlets and selecting packets output from the other node as packets to be sent to the other ringlet, and when a failure occurs on one of the nodes included in the redundancy node, selecting packets output from the other node which is free of the failure as packets to be sent to the ringlet to which the node has sent packets;

a filtering process, for permitting the ringlet, which transmits packets, to transmit received packets to said client apparatus, and inhibiting the ringlet which does not transmit packets from transmitting received packets to said client apparatus;

a multiplexing process for multiplexing packets to be transmitted to one of the ringlets which is selected as a ringlet for transmitting packets therethrough and packets to be transmitted to said one of the ringlets which is selected as a ringlet for transmitting packets therethrough by the other node;

an output switching process for multiplexing packets on its own node if packets generated based on packets received from said client apparatus are packets selected to be output from its own node to the ringlets in said output selecting process, multiplexing packets on the other node if packets generated based on packets received from said client apparatus are packets selected to be output from the other node to the ringlet in said output selecting process, and multiplexing packets on its own node if a failure occurs on the other node; and a client apparatus connecting process for connecting the redundancy node to said client apparatus through a link when in a normal state, and disconnecting the redundancy node from said client apparatus when a failure occurs, wherein the redundancy node further includes packet distributing means for performing the distributing of the received packets and output selecting means for performing the selecting of the packets output from one of the nodes, and is connected with the ringlets through the packet distributing means and the output selecting means.

21. A non-transitory computer readable medium storing a packet transfer program incorporated in a redundancy node in a packet ring network including two ringlets for transferring packets therethrough in mutually opposite directions, a redundancy node comprising two packet transfer units having the same address, for sending packets to the ringlets and receiving packets from the ringlets, and a plurality of packet processors for sending packets to and receiving packets from a client apparatus, and the client apparatus connected to said packet processors included in said redundancy node by a link, wherein said packet transfer program is executable by a computer to perform a packet transfer method; the method comprising;

a process for sending packets from one of said packet transfer units to one of said ringlets, and sending packets from one of said packet transfer unit to the other ringlets;

a process for duplicating packets received from the ringlets and distributing the received packets and the duplicate packets to the packet transfer units included in said redundancy node;

a process for detecting an occurrence of a failure on each of the packet transfer units and the packet processors included in said redundancy node, and indicating the occurrence of the failure to each of the packet transfer units and the packet processors;

a process for, when in a normal state, selecting packets output from one of the packet transfer units as packets to be sent to one of the ringlets, and selecting packets output from the other packet transfer unit as packets to be sent to the other ringlet, and when a failure occurs on either one of the packet transfer units included in the redundancy node, selecting packets output from the other packet transfer unit which is free of the failure as packets to be sent to the ringlet to which the packet transfer unit has sent packets;

a process for outputting packets received from said client apparatus to said packet transfer units, and sending packets received from the ringlets by said packet transfer units to said client apparatus;

a process for multiplexing packets received from the two packet transfer units;

a process for permitting or inhibiting a transmission of packets received from the ringlets to said client apparatus depending on whether there is a failure or not;

a process for connecting the redundancy node to said client apparatus through the link when in a normal state, and disconnecting the redundancy node from said client apparatus when a failure occurs; and a process for, when a failure occurs on one of the packet transfer units, outputting packets received from said client apparatus to the other packet transfer unit, wherein the redundancy node further includes packet distributing means for performing the distributing of the received packets and output selecting means for performing the selecting of the packets output from one of the packet transfer units, and is connected with the ringlets through the packet distributing means and the output selecting means.

* * * * *